US008024262B2

(12) United States Patent
Tai et al.

(10) Patent No.: US 8,024,262 B2
(45) Date of Patent: Sep. 20, 2011

(54) SYSTEM AND METHOD FOR DEAL MANAGEMENT OF SYNDICATED LOANS BY MULTIPLE BOOKRUNNERS

(75) Inventors: Sean Yat Sing Tai, Toronto (CA); Timothy Julian Davis Skinner, Dorset (GB)

(73) Assignee: Debtdomain GLMS Pte Ltd, London (GB)

( * ) Notice: Subject to any disclaimer, the term of this patent is extended or adjusted under 35 U.S.C. 154(b) by 209 days.

(21) Appl. No.: 11/844,786

(22) Filed: Aug. 24, 2007

(65) Prior Publication Data
US 2008/0140555 A1 Jun. 12, 2008

Related U.S. Application Data

(60) Provisional application No. 60/909,201, filed on Mar. 30, 2007, provisional application No. 60/823,432, filed on Aug. 24, 2006.

(51) Int. Cl.
*G06Q 40/00* (2006.01)
(52) U.S. Cl. ............................................. 705/38; 705/37
(58) Field of Classification Search .................. 705/38
See application file for complete search history.

(56) References Cited

U.S. PATENT DOCUMENTS

| 6,266,683 | B1 | 7/2001 | Yehuda et al. |
| 6,898,636 | B1 | 5/2005 | Adams et al. |
| 7,599,879 | B2* | 10/2009 | Louie et al. ..................... 705/38 |
| 2001/0054022 | A1 | 12/2001 | Louie et al. |
| 2002/0099645 | A1 | 7/2002 | Agarwal et al. |
| 2002/0099646 | A1 | 7/2002 | Agarwal et al. |
| 2004/0167848 | A1 | 8/2004 | Agarwal et al. |
| 2004/0172356 | A1 | 9/2004 | Agarwal et al. |
| 2005/0246257 | A1* | 11/2005 | Zhang .............................. 705/35 |
| 2006/0031412 | A1 | 2/2006 | Adams et al. |

FOREIGN PATENT DOCUMENTS

| WO | 0221311 | 3/2002 |
| WO | 0225533 | 3/2002 |
| WO | 2005059781 | 6/2005 |

OTHER PUBLICATIONS

Gale/Cengage; GIB launches tanker loan; Middle East Economic Digest (MEED); Jan. 19, 2001; p. 6.*
Dennis, Steve Allen; Agency Costs in Loan Sales. Theory and Evidence 1993; Corporate Source/Institute University of Kentucky (0102); vol. 5405A; p. 1865.*
Bushrod, Lisa; Refinancings; European Venture Capital Journal pp. 1; Jun. 1, 2005.*

(Continued)

*Primary Examiner* — Harish T. Dass
(74) *Attorney, Agent, or Firm* — Ogilvy Renault LLP

(57) ABSTRACT

Systems, and programming for improved arrangement and administration of syndicated loans using computer networks. Each of a plurality of bookrunners is authorized to invite any number of other bookrunners, as well as any number of loan participants, or underwriters (i.e. investors or lenders), to participate in offering and administering a loan, typically by providing various forms of information describing the proposed loan, including the borrower, the proposed terms, and possibly any potential participants in making the loan. Invitees who accept such invitations may be associated with the inviting bookrunner, and upon being accepted as participants may be granted by the bookrunner access to various sets of communications, documents, and other information concerning the proposed loan.

33 Claims, 33 Drawing Sheets

OTHER PUBLICATIONS

Communication Pursuant to Article 94(3) EPC, partial European search report/declaration of no search, European Patent Office, Nov. 27, 2008.

Press Release; "(LON) Dresdner launches eLoancoordinator"; Kirsten Donovan, Loan Pricing Corporation; Jun. 30, 2005.

Press Release; Europe's Loan Market Modernizing With Web-Based Order System; Michael Rothschild, Bloomberg; Jun. 30, 2005 (New York).

Declaration of Sean Y.S. Tai; Apr. 9, 2010.

* cited by examiner

| | Master Settings > Step 1 of 4 | |
|---|---|---|
| Deal Site for: | ⦿ General Syndication ○ Underwriting Syndication ○ Secondary Offer ○ Pitching | |
| [?] Name of Borrower | e.g. ABC Limited | |
| [?] Upload borrower, sponsor or project logo(s) | 677 Browse... 677 Browse... 677 Browse... | |
| Guarantor | 678 | |
| Upload guarantor logo | 679 Browse... 680 | |
| [?] Borrower Nationality | Please Select ▾ | |
| [?] Borrower Sector | Please Select ▾ If other, please specify: | |
| [?] # of Tranches | 1 ▾ | |
| [?] Document Distribution | ☑ Syndicator will be used to distribute documents to invitees. | |
| [?] Select Arrangers | Arrangers<br>Aareal Bank<br>ABC International Bank<br>ABC Islamic Bank<br>ABN AMRO<br>ABN Amro Morgans<br>Abu Dhabi Commercial Bank<br>Abu Dhabi Islamic Bank<br>Advantage Partners<br>Affin Bank<br>African Export-Import Bank<br>AgFirst Farm Credit Bank<br>Agricultural Bank of China | Arrangers for this Deal<br>Standard Bank<br><br>∧ ∨ |
| | If not listed, please contact service@debtdomain.com | |

Next

Figure 4a

Syndicator > Create Deal

| | Master Settings > Step 3 of 4 | |
|---|---|---|
| Tranche A | Amount 100 MM ⦿USD ○EUR ○GBP -- Select Other -- | 682 |
| Tranche B | Amount 200 MM ⦿USD ○EUR ○GBP -- Select Other -- | |
| Tranche Names | Tranche A Term Loan | |
| | Tranche B Revolving Credit | 683 |
| Multiple Bookrunners | Each invitee will be allocated to a bookrunner and:<br>⦿ Contact info and comments will be shared among bookrunners.<br>   - All bookrunners will have full view of syndication status.<br>○ Contact info will not be shared. Comments will be shared.<br>   - All bookrunners will have full view of status and yet keep contact info private<br>○ Contact info and comments will not be shared. | 684 |
| Ratings | Borrower ▸ S&P ▸ Moodys ▸ Fitch ▸ | |
| Website | Borrower ▸ | |
| Invitee Event | Complete the following if invitees are being invited to attend a bank presentation or borrower/site visit | 685 |
| | Event Name<br>   e.g. Bank Meeting | |
| | Event Details [-Format- ▸ B I U ᴀʙᴄ Ω | × ⎘ ⎗ ⎕ a ⤺ ⤻ | HTML ]<br>   e.g. A bank meeting is to be held in London on Friday 15 July at 5pm. | |
| Add colleagues | ☑ Allow invitees to add/give deal access to colleagues (recommended). Bookrunner Contacts are notified when colleagues are added. | |
| Reverse enquiries | ☐ After launch, allow Debtdomain users that are interested in your deal and not invited to email yourself and other Bookrunner Contacts | |
| Public investors | ☐ Allow investors to declare their status as "public" and thus be able to view information that you specify as appropriate for public side investors. A full history and audit trail of the disclosures of both public and private information will be available to the arranger(s) and the investors. | |

686 → (Add colleagues)
687 → (Reverse enquiries)
688 → (Public investors)

[ Next ]   [ Back ]

Figure 4c

Syndicator > Create Deal

| | Master Settings > Step 4 of 4 |
|---|---|
| Facility Name | USD300MM Multi-tranche Facility    689 |
| ☑ Confi Agreement | ⦿ Will be viewed and accepted on-line by my Invitees. A Confi Status report will be available.<br>○ Will be sent via email by Debtdomain Syndicator to Invitees. The Bookrunner will record the receipt of the confi agreement from invitees on Syndicator. Invitee contacts from the relevant institution will then be automatically notified that they can access docs.<br>○ Distributed by bookrunner(s) (not using Syndicator). Invitations will not be sent by Syndicator. The Bookrunner will record the receipt of the confi agreement from invitees on Syndicator. Invitee contacts from the relevant institution will then be automatically notified that they can access docs.<br>○ None required e.g. publicly available information only.    } 690 |
| Select On-line Confi | ⦿ LMA Confidentiality Letter for Syndication   } 691<br>○ Our own Confidentiality<br><br>Please review and amend the standard agreement below for the bracketed/optional items.<br><br>[-Format-▼] B / U ᴬᵇᶜ Ω ¦ ✕ ⎘ ⎗ ⎘ ⎘ ⌐ ⌐ ¦ HTML<br><br>undertaking made by us in this letter) who in each case is operating on the public side of an information barrier unless such person is acting on the instructions of a person who has received Confidential Information and is aware of the proposed Facility.<br><br>"Group" means the Borrower and each of its holding companies and subsidiaries and each subsidiary of each of its holding companies ( as each such term is defined in the Companies Act 1985).<br><br>"Participant Group" means you, each of your holding companies and subsidiaries and each subsidiary of each of your holding companies ( as each such term is defined in the Companies Act 1985) and where such term is used in Part B of this letter and the definition Of "Front Running" each of your or their directors, officers and employees (including any Sales and trading teams).<br><br>"Permitted Purpose" means considering and evaluating whether to enter into the Facilit [y/ies].    } 692 |
| Invitations | ⦿ Personalised invitations will be sent via Debtdomain. Invitations will be the same for all Invitees.<br>○ Personalised invitations will be sent via Debtdomain. There will be different invitations for Senior and General Invitees.<br>○ Invitations will not be sent via Debtdomain.    } 693 |

694     [ Next ]   [ Back ]

| Activities | Reports | Other |
|---|---|---|
| → Bookrunning | → Syndication Status | → Duplicate Deal |
| → Update Deal Team | → Bookrunning | → Invitee Screen |
| → Deal team | → Contacts | → Master Settings |
| → Documents | → Confidentiality Status | → Calendar |
| → Add Invitees | → Bank Meeting | → Email Log |
| → Invitation | → Document Access<br>  - by Institution<br>  - by Contact | → Allocate Syndication Office |
| → Broadcast |  | → Export Date |
|  | → Invitations | → Archive |

FIGURE 8

Metro AG USD675MM Deal > Syndication Status Report 29 Mar 06
Show Probable commitments | Hide Syndication Office | Hide Confi  All Notes

3000

| Summary | USD MM | % of Original Deal amount |
|---|---|---|
| Firm Commitments | 425 | 62.96 |
| Available inventory | 250 | 37.04 |
| Possible Commitments | 125 | 18.52 |
| Firm and possible Commitments | 550 | 81.48 |

3002

| Status | Number |
|---|---|
| Invited | 217 |
| Committed (ex. arrangers) | 3 |
| Processing (Probable commitments) | 2 |
| Processing (Confi accepted) | 1 |
| Processing (No confi) | 1 |
| Declined | 210 |

3004

| Arrangers | Comment | | | USD MM |
|---|---|---|---|---|
| ABN AMRO | | | | 50 |
| Bank of Tokyo-Mitsubishi | | | | 50 |
| Commerzbank AG - Corporates & Markets | | | | 50 |
| ING Wholesale banking | | | | 50 |

3006 — 3009

| Committed | Confi | Syndication Office | Comment | USD MM |
|---|---|---|---|---|
| ABN AMRO | 27 May | ING | Commitment fax received. - 3 Jun | 75 |
| Landesbank Rheinland Pfalz | 18 May | ABN AMRO | | 75 |
| Sumitomo Mitsui Banking Corporation Europe Limited | 27 May | Bank of Tokyo-Mitsubi | Will participate for $75MM but their allocation will be signed for by BTM and be transferred immediately upon signing of the main facility agreement to Standard Chartered Bank. - 29 Mar | 75 |
| Standard Chartered Bank | | | | |

3008

| Processing Probable Commitments | Confi | Syndication Office | Comment | Estimate USD MM | Chance |
|---|---|---|---|---|---|
| Banca Intesa | 26 May | Commerzbank | Decision in 1 week - 29 Mar | 75% | 50% |
| Bank of New York | | Bank of Tokyo-Mitsubi | Needs updated cashflow analysis - 29 Mar | 50% | 75% |

3010

| Processing Confi accepted | Confi | Syndication Office | Comment |
|---|---|---|---|
| American Express Bank | 19 May | Commerzbank | He gave me a verbal commitment. We will get the fax by tomorrow. - 2 Jun |

Syndicator > Georgia plc USD100MM Deal > Draft Allocations 14 Aug 07
View Allocations The following institutions have the same commitment but different allocations:
Commerzbank, RZB, Standard Bank — 3601

Jump to: 3609 Update >>

| Publicity Name | Commitment USD MM 3602 | Method 3604 | Time Received BST 3606 | Title 3608 | Draft Allocation USD MM |
|---|---|---|---|---|---|
| Arrangers — 3610 | | | | | |
| Commerzbank | 7.5 | - | 13 Apr 07 10:57 AM | Mandated Lead Arranger | 7 |
| RZB | 7.5 | - | 13 Apr 07 10:57 AM | Mandated Lead Arranger | 3 |
| Standard Bank | 7.5 | - | 13 Apr 07 10:55 AM | Mandated Lead Arranger | 7 |
| Committed — 3610 | | | | | |
| Société Générale | 15 | Fax | 43 mins ago | Lead Arranger | 5 |
| Bank Austria Creditanstalt | 2.5 | Fax | 13 Apr 07 2:40 PM | Manager | 2 |
| HVB | 2.5 | Letter | 13 Apr 07 2:46 PM | Manager | 2 |
| Possible Commitments — 3610 | | | | | |
| Banco BPI | - | 50% | 12 Apr 07 10:20 AM | | |
| Bank of Overseas Chinese | - | 50% | 12 Apr 07 8:46 AM | | |
| Bank Sinopac | - | 75% | 13 Apr 07 8:37AM | | |
| BRE Bank | - | 75% | 13 Apr 07 10:05AM | | |
| Credit Europe Bank | - | 50% | 9 Jun 07 6:07 PM | | |
| Erste Bank | - | 50% | 16 Apr 07 8:54 AM | | |
| HSBC | - | 50% | 12 Apr 07 9:39 AM | | |
| Intesa Sanpaolo | - | 75% | 12 Apr 07 9:47 AM | | |
| Landesbank Berlin | - | 75% | 13 Apr 07 10:22AM | | |
| Mizrahi Tefahot Bank | - | 25% | 16 Apr 07 9:24 AM | | |
| 16 Institutions | 42.5MM | | | | 26MM |

Figure 9b

Syndicator > Georgia plc USD100MM Deal > View Allocations 14 Aug 07

Notify Allocations

| | USD |
|---|---|
| Mandated Lead Arranger | |
| Commerzbank | 7,000,000 |
| Standard Bank | 7,000,000 |
| RZB | 3,000,000 |
| Lead Arranger | |
| Société Générale | 5,000,000 |
| Manager | |
| Bank Austria Creditanstalt | 2,000,000 |
| HVB | 2,000,000 |
| Total | 26,000,000 |

Figure 9c

Syndicator > Georgia plc USD100MM Deal > Notify Allocations

| Summary | USD |
| --- | --- |
| Launch Amount | 100,000,000 |
| Allocated Amount | 26,000,000 |
| Over Subscription | -74,000,000 |

Information to be Sent

◉ Provide all Final Allocations to all committed institutions (as per View Allocations)

○ Provide to each committed institution their own Final Allocation on a blind copy basis Distribution Method ◉ Distribute Final Allocations in a broadcast email (more convenient)

○ Inform Institutions that Final Allocations have been posted to the documents area (more secure)

Enter Password to confirm Final Allocations and notify committed institutions [         ]  [ Go >> ]

Figure 9d

Syndicator > ABC Widgets Inc USD150MM USD150MM Facility > Commitments Oct 30

Column Filter                                         Jump to: [▶]

🗖 ☒ 🗇

| Tranche A | 3802 | 3804 | 3806 | 3808 | | 3809 | | 3810 | 3812 | |
|---|---|---|---|---|---|---|---|---|---|---|
| Bank | Lender | Contact | USD Commitment | Time Received EDT | % of Total | Title | | Fees bps | Admin Form | Tax Form |
| Aareal Bank | Aareal Bank | Ms Anke Nitz | 15 MM | Oct 27 12:38 PM | 24.2 | Mandated Lead Arranger | | 10.00 | Yes | Yes |

| Tranche B | | | | | | | | | | |
|---|---|---|---|---|---|---|---|---|---|---|
| Bank | Lender | Contact | USD Commitment | Time Received EDT | % of Total | Title | | Fees bps | Admin Form | Tax Form |
| ABC International Bank | ABC International Bank | Mr Paul Jennings | 20 MM | Oct 27 12:50 PM | 32.3 | Senior Arranger | | 12.00 | Yes | No |
| AB Svensk Exportkredit | Swedish Export Credit Corporation | Mr Anders Nilsson | 12 MM | Oct 28 02:17 PM | 19.4 | | | | No | No |
| Aareal Bank | Aareal Bank | Ms Anke Nitz | 5 MM | Oct 27 12:38 PM | 8.1 | Mandated Lead Arranger | | 5.00 | Yes | Yes |

Figure 9e

Colorado Homes USD150MM Deal > Admin Details > Summary

Click to add/update:

| | | |
|---|---|---|
| Booking Office | | National City Funds<br>25 Monroe Avenue<br>T: 1 216 5753324<br>F: 1 216 5753323<br>sean.jacobs@natcity.com |
| Publicity Name | | National City Bank |
| Credit Contacts | 3520 | National City<br>Javier Yves<br>T: 216 9348254<br>F: 216 9348252<br>javier.yves@nationalcity.com |
| Operations Contacts | | National City<br>Geoff Helman<br>T: 216 42534543<br>F: 216 42534541<br>geoff.helman@natcity.com |
| Documentation Contacts | | ☒ |
| Payment Instructions<br>↑<br>3502 | | USD<br>National City Corporation<br>25 West Monroe St<br>National City Bank Corporation |

Figure 10a

Colorado Homes USD150MM Deal > Admin Details > Payment        Return to Admin Details Summary Select currency(s): ☑ USD ☐ EUR ☐ GBP ☐ AUD ☐ CAD ☐ CHF ☐ CZK ☐ DKK ☐ HKD ☐ JPY ☐ NOK ☐ NZD ☐ PLN ☐ SEK ☐ SGD

| Listed below are USD accounts for National City. If any of these are the appropriate accounts for this deal then select them below. Alternatively, you can create new USD accounts by clicking Add USD Account. | | | | | |
|---|---|---|---|---|---|
| Bank Name | Account Name | Name | City | Phone/Email | Select for this Deal |
| National City Corporation | National City Bank Corporation | - | - | - | ☑ |
| | | | | | Save >> |

Figure 10b

Caroline Daser has deal activity which must be transferred to a suitable colleague before he may be deleted

- primary deal postings
- access to primary arranger teams
- invitations to primary deals
- documents for primary deals
- email communications
- notes

1602

Set out below are colleagues of Caroline Daser sorted in the following order:

1. Same email address;
2. Is a bookrunner contact (as Caroline Daser is a bookrunner for at least one deal):
3. Same department/city/region.

1603

| Name/City | Comment | Title/Department |
|---|---|---|
| ◉ Mr Lother Schlichting<br>Frankfurt | Bookrunner contact | Syndicated Loans (Distribution)<br>Corporates & Markets |
| ○ Mr Eric Zimny<br>Frankfurt | Bookrunner contact | Assistant Vice President, Debt Capital Markets<br>Origination<br>Origination |
| ○ Mr Matthias Becker<br>Frankfurt | Bookrunner contact | Debt Capital Markets - Loan Distribution |

Subject: Georgia plc USD100MM Deal - New documents available (Dev) ⟵ 1401

Dear Beatriz Lacaz,

The following documents are now available to you as a result of Societe Generale's commitment to this deal:

EVMB IM Final 110407
Evrofinance Mosnarbank CFS 6m 2006  } 1402
Facility Agreement
Facility Agreement
Moody's Report To download these documents, login to http://dev.debtdomain.com and click on the Syndicator tab.
                                              ⟵ 1403

If you have any questions, contact David Smith on 44 20 23432423  } 1404

Figure 14b

Syndicator > Bank Pivdennyi USD30MM Deal > Add Jack Rabbit of HVB
                    4004      4005                                                    4006

You may have entered an incorrect email address or name as there is a discrepancy below. Please select/update or correct the email address or name if required.

Email entered:   [Jack_ravbit@hvbamericas.com]   4001

Name entered:    [Jack]   [Rabbit]   4002

[Next >>]   4003

Figure 14c

Contact Info

| Name | ▼ Inna Gogoua | Phone | 216 222 8193 |
|---|---|---|---|
| Title (e.g. VP) | International Banking Officer | Other Phone | 216 |
| Department | International Credit and Portfolio Administration | Cell | |
| Job Function | Financial Institutions ▼ | Fax | 216 |
| Institution | National City (United States) | Email | n/a |
| Business Entity | Leave blank if Business Entity is National City | Other Email | Public address (e.g. yahoo) not accepted |
| Colleague | | Address | |
| | | City | Cleveland OH ▼ 3:50 PM ▶ |
| | | | If city is not listed then complete below: |

Admin Details

| Login | inna.gogoua@nationalcity.com | Status | ● Active ○ Delete |
|---|---|---|---|
| Password | ○ Reissue ○ SLX Welcome Email | Created | 2 Apr 2007 by Hana Ziak of Bank Austria Creditanstalt |
| Logins | 3 times: latest 5 Apr 2007 at 4:02 PM BST | Permission | ☐ Bookrunner ☐ Arranger ☐ Agency<br>☐ Pipeline ☐ Compliance |
| Owner | Landesbank Berlin, RZB, Bank Australia Creditanstalt | Contact Logo | [ Browse ] |

Figure 15b

SYSTEM AND METHOD FOR DEAL MANAGEMENT OF SYNDICATED LOANS BY MULTIPLE BOOKRUNNERS

This application claims the benefit of U.S. provisional patent application Ser. No. 60/823,432, filed 24 Aug. 2006 and entitled "MANAGEMENT OF SYNDICATED LOANS BY MULTIPLE BOOK RUNNERS", and Ser. No. 60/909,201, filed 30 Mar. 2007 and entitled "SYSTEM AND METHOD FOR MANAGEMENT OF SYNDICATED LOANS BY MULTIPLE BOOK RUNNERS"; the entire contents of each of which, including any appendices, are incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

The present invention relates to systems and methods for creating, monitoring, updating, negotiating and completing syndicated loans, and in particular to systems and methods relating to syndicated loans having multiple bookrunners.

SUMMARY OF THE INVENTION

In various aspects the invention provides systems, methods, and computer programming for improved secure communications and data management and control. The invention has particular applicability to the arrangement and administration of business transactions, such as new syndicated loans offered by banks and other parties, and in particular loans administered by multiple bookrunners. In particular, in various aspects the invention provides improvements in secure and effective management and protection of communications and documents. The secure communications thus provided are particularly useful in, for example, financial transactions which require the sharing of data and other information among multiple arrangers, investors or other lenders, and between lawyers, borrowers, advisors, auditors, and other members of loan syndication/distribution teams.

In various embodiments the invention enables the creation, review, and management of data relating to loans and other transactions coordinated by multiple arrangers or bookrunners, who may be jointly and severally designated as authorized keepers of various documents used in processing, executing, and otherwise documenting single syndicated loans. For example, the invention provides methods, systems, and programming for improved arrangement and administration of syndicated debts using computer networks. Each of a plurality of bookrunners is authorized to invite any number of other bookrunners, as well as any number of loan or debt participants, or underwriters (i.e. investors or lenders), to participate in offering and administering a debt such as a new loan, typically by providing various forms of information describing the borrower, its industry sector, credit analyses and prospects, the proposed terms for the syndicated loan facility, and possibly any potential participants in making the loan. Invitees who accept such invitations may be associated with the inviting bookrunner, and upon being accepted as participants may be granted by the bookrunner access to various sets of communications, documents, and other information concerning the proposed loan, including documents which are (a) maintained in confidence between the bookrunner and one or more of such accepting participant(s)—such as legal documents (draft facility agreement); and (b) which are shared between all or sets of bookrunners and other participants.

Among the advantages offered by syndicated debt bookrunning in accordance with invention are the display of investor and syndication-contact information in a systematic way, so as to improve possibilities for the identification and selection of prospective investors and contacts; recording and tracking of investor feedback; and reporting on syndication status. For example, one of the features offered by the invention which enables such functionality, and other advantages, is the provision of centralized, common databases (i.e., data sets) of data related to institutions, individuals, and other parties who may be helpful in setting up, processing, or otherwise assisting in the syndicated deal process. For example, the invention provides one or more centralized databases comprising relevant information pertaining to banks, lenders, investors, arrangers, bookrunners, and others who might be desirable participants in the loan syndication process. Such databases, and various reports based on data stored in such databases, can be made available to all authorized users of a syndication system, or to selected subsets of such users. For example, all potential bookrunners and arrangers can be provided access to such information, which they may use in identifying and reaching out to likely participants.

In preferred embodiments, such information is searchable and cross-indexed, so that individuals seeking to contact, review, or identify prospective participants can locate correct, standardized information identifying and otherwise describing such participants, and that the common or shared use of correct information can be assured.

In further embodiments, redundantly-stored information can be synchronized automatically, or upon user confirmation, following user modification, and/or notice of modifications to data may be automatically provided for users who might be affected by or otherwise concerned about such changes.

In one aspect the invention provides systems, methods, and computer programming for processing data pertaining to a syndicated loan offering to be administered by a plurality of bookrunners. For example, media according to this aspect of the invention can comprise computer-readable code for causing a computer to receive data (or signals representing such data) identifying a plurality of invitees, where at least one of the invitees is or has been invited by each of a plurality of bookrunners to participate in a syndicated loan offering to be administered by the plurality of bookrunners. Subject to receipt of data indicating acceptance of such invitations by the invitees, the computer can be caused to identify accepting invitees as participants in the syndicated loan offering and associate with data identifying each participant a data-access authorization, where the data-access authorization associated with each respective participant is adapted to permit access by the respective participant to at least a deal data set and a bookrunner data set. The bookrunner data set can be accessible by the bookrunner that invited the participant to participate in the loan, by the respective participant, and by at least one other participant invited by the bookrunner to participate in the loan. The deal data set can be accessible by, for example, all participants participating in the syndicated loan offering.

In a related aspect, the invention provides systems, methods, and computer programming for processing data pertaining to a syndicated loan offering to be administered by a plurality of bookrunners. For example, media according to the invention can comprise computer-readable code for causing a computer to, in response to submission to a syndicated loan application server of a data-access authorization received in response to acceptance of an invitation from one of a plurality of bookrunners administering a syndicated loan offering to participate in the syndicated loan offering, either as a loan participant or as a loan arranger, enable access to data stored within at least one of a bookrunner data set and a deal data set, wherein the data-access authorization is adapted to permit access by the respective participant to at least a deal data set and a bookrunner data set, the bookrunner data set is accessible by the bookrunner that invited the participant to participate in the loan and by a plurality of loan participants invited by the bookrunner to participate in the loan, and the deal data is set accessible by all participants and all bookrunners participating in the syndicated loan offering.

The invention further provides systems, methods, and computer programming for processing data pertaining to a syndicated loan offering to be administered by a plurality of bookrunners in which, for example, media according to the invention can comprise computer-readable code for causing a computer to associate with data received by the computer data identifying the received data as associated with a syndicated loan offering and as associated with one of a plurality of bookrunners administering the syndicated loan offering; store the received data in persistent computer-readable memory, and, subject to verification of authority, allow access to the stored data by at least one of (a) the bookrunner with whom the stored data has been associated, and (b) a participant authorized on behalf of the bookrunner to access the data. Such data can comprise, for example, data representing documents associated with syndicated loan offering, and/or contact or other information relating to confirmed or potential loan bookrunners, underwriters, participants or invitees.

In further aspects, as described below, the invention provides systems, methods, and computer programming for processing data pertaining to a syndicated loan offering to be administered by a plurality of bookrunners in which, for example, media according to the invention can comprise computer-readable code for causing a computer to upon entry of an execution command from a borrower or other input system, access data corresponding to the status of a plurality of criteria relating to the offering of the syndicated loan, access to said data controlled by a plurality of bookrunners administering said syndicated loan offering; and display on an output device associated with the borrower input system, in human-readable form, information indicating said status. Such information can, in addition or instead, be output in spreadsheet or other format for permanent soft or hard storage.

Further aspects of the invention are described below.

As will be understood by those skilled in the relevant arts, a bookrunner is a syndicated loan arranger charged with responsibility for all or part of the bookbuilding process for a prospective loan. A joint bookrunner is a syndicated loan arranger charged with responsibility for part of the bookbuilding process for the prospective loan. Each joint bookrunner is typically responsible for underwriting a portion of the loan. For example, for a $500 million deal with two joint bookrunners, each bookrunner may undertake to underwrite $250 million each. The portion(s) of the loan associated with a single bookrunner may be spread across or divided among any one or more of any tranches the loan is to be divided into. An arranger is a bank or other financial institution responsible for underwriting a portion of a loan that may not necessarily be assigned responsibility for bookbuilding/distribution of the deal.

For purposes of this disclosure, the term "joint bookrunner" is shortened to "bookrunner"; the two are used interchangeably, as the distinction, where applicable, is clear from the context.

Administration of a loan or other transaction can involve any aspect of arranging, documenting, memorializing, or offering an existing, past, or prospective loan.

BRIEF DESCRIPTION OF THE DRAWINGS

The foregoing and other aspects of the invention will become more apparent from the following descriptions of specific embodiments thereof and the accompanying drawings which illustrate, by way of example only, the principles of the invention. In the drawings, where like elements feature like reference numerals (and wherein individual elements bear unique alphabetical suffixes):

FIGS. 4A-10B are schematic diagrams of embodiments of user interfaces suitable for use in implementing the invention.

FIG. 13 is a schematic flow diagram of an embodiment of a process in accordance with the invention.

FIGS. 14B-14D are schematic diagrams of embodiments of user interfaces suitable for use in implementing the invention.

FIGS. 15B-15F are schematic diagrams of embodiments of user interfaces suitable for use in implementing the invention.

DESCRIPTION OF EMBODIMENTS

The description which follows, and the embodiments described therein, are provided by way of illustration only; as examples of specific embodiments of the principles of the invention. These examples are provided for the purposes of the explanation of concepts, and not limitation.

Figure 1:
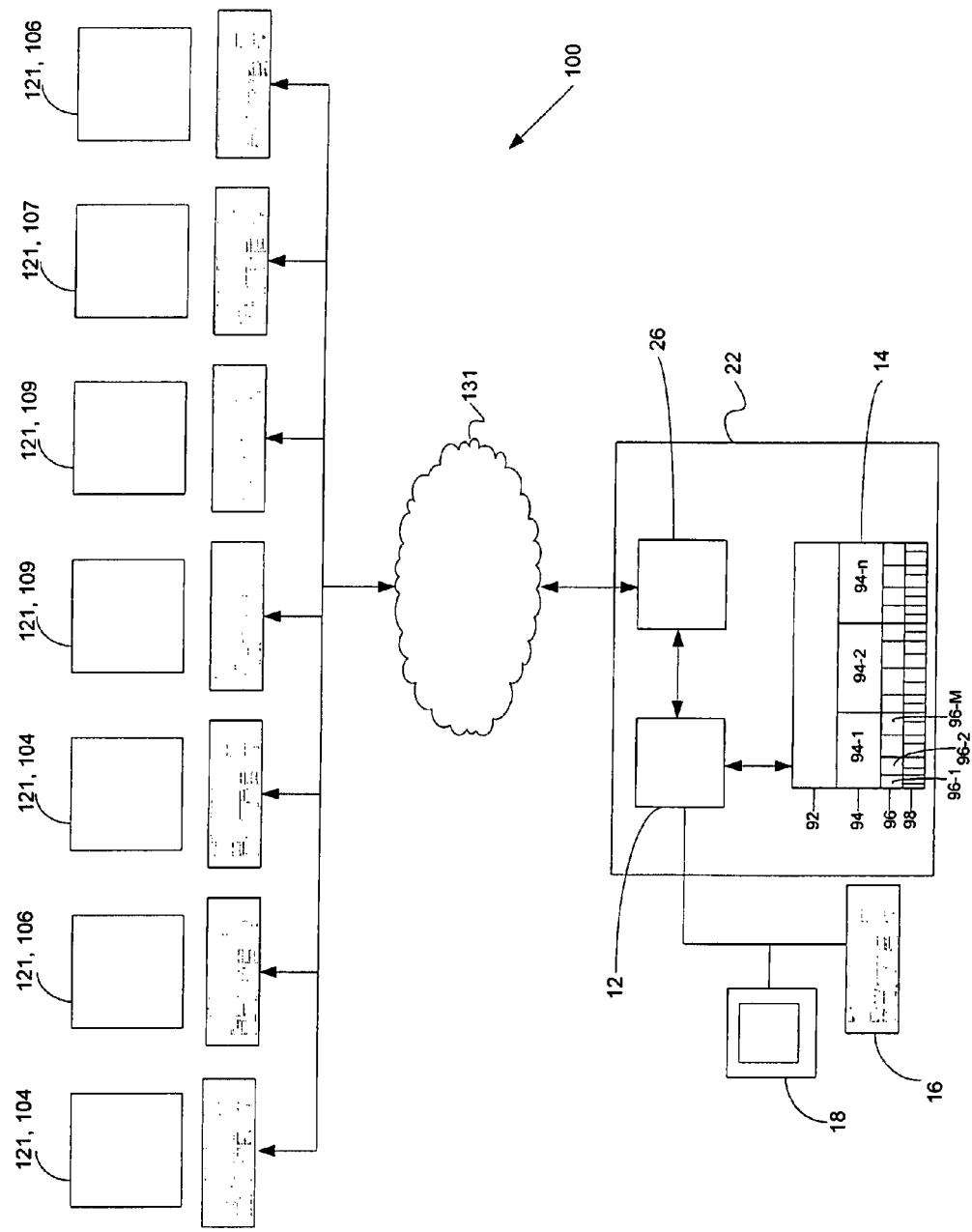
FIGS. 1 and 2 are schematic block diagrams of embodiments of systems in accordance with of the invention.
Figure 2:
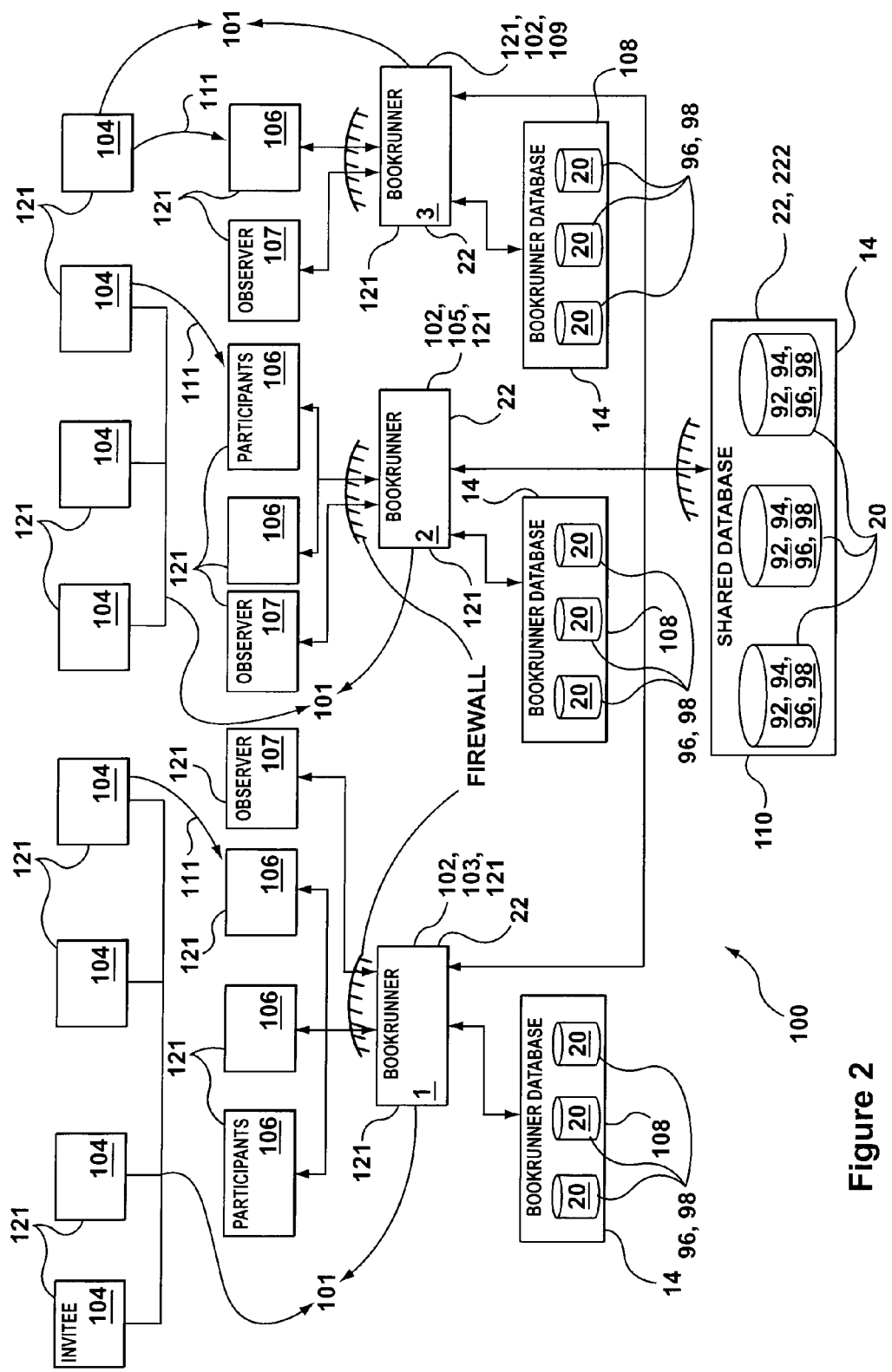

FIGS. 1 and 2 are schematic block diagrams of sample systems suitable for use in implementing various aspects of the invention, and in particular various examples of multi-level controlled data structures in accordance with the invention. In for example the embodiment shown in FIG. 1, system 100 comprises a data and application server 22, which comprises one or more processors 12 and data storage facilities 14, which can further comprise distributed data storage elements or databases such as data storage facilities 20 shown in FIG. 2.

Data and/or application server 22 can further comprise communications server(s) 26, input device(s) 16, and output device(s) 18. Communications server(s) 26, input device(s) 16, and output device(s) 18 can be adapted for enabling data server 22 to communicate with one or more user systems 121 via, for example, communications network 131. Communication server(s) 26 can include any suitably-configured combinations of hardware and/or software; including for example commercially-available web servers such as the Apache® system, which, among other advantages, provides web hosting and server capabilities and facilitates communication with network 131 and handles information exchange with user stations 121. Communication server 26 may facilitate communicate with other computers, including systems operated, controlled, or otherwise employed by any one or more of invitees 104, participants 106, bookrunners 102 or systems 102 via communication network 131.

Communications network 131 may include any communication network(s) or communication devices, or combinations thereof, suitable for use in implementing systems and processes of the type described herein, including for example local- or wide are networks (LANs or WANs, respectively), including, for example, the Internet. Communication network 131 may be accessed via and facilitation communications using wireless communication, infrared, bluetooth, ethernet connection, a combination thereof, and/or via any other suitable data communication technique. Communication network 131 may allow for encrypted or otherwise secured transmission of data between any of the users and entities of system 100.

User systems 121 can be provided or otherwise adapted for use by any of a very wide variety of users who require or would benefit from access to various sets of multi-level controlled data structures stored in storage facilities 14, including for example data storage elements or databases 20. For example, in an embodiment of the invention adapted for the offering and administration of loans, any one or more of user systems 121 can be used by any one or more bookrunners or other loan or transaction arrangers, underwriters or participants, borrowers, or service providers such as accounts, lawyers, or managers, in any desired combinations, for controlled, secure access to various sets of data stored in storage facility 14.

User systems 121, data servers 22, communications servers 26, and other computers and data processors provided in accordance with the invention can comprise any computers or data processors, and are usually coupled with and/or comprise suitable input and output systems/devices, 16, 18, such as keyboards, pointers, display screens, etc., and communications servers and other devices suitable for use in implementing the systems and methods described herein. For example, a wide variety of server class, desktop, personal, palmtop, and other computing or data processing devices comprising input devices 16 and output devices 18 and suitable for use in implementing the various aspects of the invention are now known, and are commercially available; doubtless others will hereafter be developed.

In particular, processor(s) 12 can include any processor(s) that provides the capability for system 100 to execute commands and access storage 14, receive inputs from input devices 16 and provide outputs to output devices 18 coupled to server 22 and/or any of user systems 121 in accordance with the invention. Input device(s) 16 may include one or more input devices including keyboards, mice, devices attached to USB ports, scanners, etc. Output device(s) 18 may include any device(s) which receive signals from the system 100 and/or processor 12 and process them in accordance with the described processes. Output device(s) 18 may include, for example, display monitors, printers, facsimile machines, network interfaces or any communications devices or systems adapted to deliver messages or other information to one or more users of the system 100. Note that for purposes of this disclosure, facsimile numbers are telephone numbers.

The term "user" as contemplated herein can include bookrunners, arrangers, invitees, participants, borrowers, lawyers, administrators, and/or others associated with the loan syndication (e.g., bookbuilding or bookrunning) and/or administration process, and non-participating observers.

Many of the functions provided by the invention may be implemented using specially-designed dedicated electronic circuits, general purpose data processors executing specialized software programming, and/or combinations thereof. As will be understood by those skilled in the relevant arts, a wide number of suitable computer programs, programming languages, compilers, and general- and special purpose processors are now available commercially, and doubtless they will continue to be developed.

Storage devices or facilities 14 may include any forms of storage media known for computers and suitable for the purposes described herein. These may include, for example, disk drives, CD Rom drives, other magnetic or optical drives, memory devices such as ROM or RAM, or USB devices that store data in volatile or persistent form. Preferred storage facilities 14 provide for multiple levels and divisions of secure or otherwise controlled access. For example, in the embodiment shown in FIG. 1, storage facility 14 comprises a global database or other "public" data set 92, a plurality of first-level private data sets 92, pluralities of second-level private data sets 96, and pluralities of third-level private data sets 98. Each of first-level private data sets 92 is associated with a plurality of second-level private data sets 96, each of which is further associated with a plurality of third-level data sets 98.

For example, in an embodiment of the invention shown in FIG. 1 and adapted for use in administering syndicated loan offerings, global data set 92 can comprise data intended to be shared among all authorized users of system 100 and/or data storage facility(ies) 14, and/or other systems supported by data server 22. This can include, for example, data representing contact information useful in establishing communications with bookrunners or other arrangers, borrowers, lenders (including for example both invitee and participant lenders), support service providers, and others, so that the proposal and administration of loan offerings can be made easier and more efficient.

Similarly, first-level private data set 94 can comprise data associated with one of a plurality of syndicated loan offerings, access to which is restricted to a subset of the users authorized to access data facility 14. Each corresponding loan offering can be administered, for example, by a plurality of bookrunners, and control access by invitees, loan participants, and others to one or more first-level private data sets 94.

Second-level private data sets 96 can comprise data associated with one, and access to which is controlled by, individual bookrunners and the loan participants associated with such bookrunners, including, for example, data representing documents associated with portions of a syndicated loan offering to be administered by a plurality of bookrunners.

Third- or other-level private data sets 98 can comprise data associated with individual bookrunners and individual loan participants, service providers, etc., associated with the bookrunners, including, for example, data representing documents associated with agreements or other communications made between such bookrunners and participants or service providers.

Access to progressively or variously restrictive sets 92, 94, 96, 98 can be provided by any suitable access control codes or devices. For example, a single user identification/password (UUID/pswd) combination applicable to multiple levels of the data structure intended to be accessible to the user (e.g., one or more of all data sets 92, 94, 96, 98), or a plurality of UUID/pswd combinations, each specific to one or a few data sets 92, 94, etc., can provide authority to a user to access all data stored in global data set 92, and to data stored in any one or more of first-, second-, third, etc., level private data sets associated with particular loan offerings, bookrunners, and participant or service provider groups.

Data structure 14 can be provided in a unified database located on a single machine or at a single site, and/or in the form of multiple data structures stored in distributed fashion on multiple machines/sites. One or more individual machines/data sites may be operated, for example, by or on behalf of a facilitator of syndicated loan offerings, who provides systems and software to support the secure storage of and access to data related to syndicated loan offerings. For example, in some preferred embodiments of the invention data facility 14 is operated by a secure data facility service provider employed by or working on behalf of a syndicated loan facilitator, who facilitates offering of one or more syndicated loans by groups of bookrunners and other arrangers.

In the embodiment shown in FIG. 1, system 100 provides for access to data facility 14 and one or more of data sets 92, 94, 96, 98 in response to receipt of suitable input signals received from input device(s) 16 associated with data server 22 and/or any one or more of user systems 121, subject to verification of access authority. Bookrunner or deal information, or any other information stored in data structure(s) 14 may then be provided or otherwise made accessible to the user via output device(s) 18 associated with user systems 121 and/or data server(s) 22.

Another example of a system architecture suitable for use in implementing the various aspects of the invention is shown in FIG. 2. In the embodiment shown in FIG. 2, control of data structures or facilities 14 and optionally other functions provided by data server 22 are distributed between a number of systems 22, including for example a plurality of bookrunner systems 102, and dedicated data server 222. As will be understood by those skilled in the relevant arts, the distributed storage of both common and separate data sets 92, 94, 96, 98 is well understood, and may be accomplished in a wide variety of ways, many of which are now known and others of which will doubtless hereafter be developed. For example, partitioned databases or storage devices may be employed, and/or common storage devices coupled with suitably formatted individual data records, comprising fields identifying the one or more data sets 92, 94, 96, 98 with which any individual data item is associated.

In both embodiments user stations 121 comprise invitee workstations 104, participant workstations 106, bookrunner or other arranger workstations 109 (identified individually as 103, 105 and 109 in FIG. 2 and/or as bookrunners 102 as shown in FIG. 1), and observer or service provider workstations 107.

In various embodiments, one or all of the various levels of data sets 14, etc., can include relational databases that each store information relating to a particular bookrunner with respect to one or more particular deals; individual databases can include sub-databases with varied levels of restriction or access. Referring to data structure 14 of FIG. 1, database or data set 92 can be implemented as a global database accessible to all authorized users of the system 100, and can include as sub-databases deal databases 94-1 through 94-N, each corresponding particular loan offerings or other transactions; bookrunner databases 96, each corresponding to and under the direct or indirect control of for example a bookrunner administering the loan offering corresponding to the respective deal data set 94; and participant databases 96, which are accessible to individual or combinations of participants participating in individual loan offerings under the invitation and control of bookrunners controlling the corresponding bookrunner databases 96.

In various embodiments, depending upon the requirements imposed by the party(ies) controlling access to the various data sets 92, 94, 98, 98, one or more of the data sets, e.g., data set 92, may be thought of as "public" or "global" data sets, and others, e.g., data sets 94, 98, 98, as "private" data sets of varying degrees of control. As will be understood by those skilled in the relevant arts, the terms "public", "private", and "global" are more or less relative, depending upon hardware, software, and security requirements for access.

All or any desired portions of data structures 14 can be understood as relating to individual loans or other transactions, or other uses or purposes altogether. For example, data corresponding to a first transaction can be stored within data set 94-1, with data sets related to other transactions stored in data sets 94-2, . . . 94-N. In the example shown, databases corresponding to N deals have been provided. Likewise, the data set 94-1 comprises corresponding bookrunner databases 96-1-96-M, controlled by the M various bookrunners involved in offering or otherwise administering the transaction, and each of the M bookrunner databases comprises an arbitrary number of data sets accessible to the various individual participants associated with each of the individual bookrunners.

Figure 4B:

As will be understood by those skilled in the relevant arts, in many implementations a single database can be provided, with internal partitions or other controls to restrict access to single users, or sets of users, to accomplish the various purposes described herein. For example, a single physical or virtual database can be provide that stores deal data, contact data and comments which are associated with deals and contacts. In such instances, concepts such as visibility mapping or other authorization means can be used to control access to data and/or sets of data—that is, to control which one or more bookrunners, participants, or other users can view and/or authorize access to the data. For example, in some cases a single bookrunner can be authorized to create, store, or authorize access to a piece of data; in other cases multiple bookrunners can share some or all of such authority. For example, it may be desired for all bookrunners, participants, and or other individuals or classes of users to access data related to a contact or a document. In many implementations, it may be advantageous for access to user comments and deal data to be strictly controlled, where for example authority is provided to only one or a few bookrunners or other users. (See, for example, data input item set 684 of FIG. 4C, described below.)

System(s) 22 controlling data structures 14 may be adapted to operate software or hardware applications adapted to perform or assist in performing a wide variety of functions, including for example providing access to data in storage 14, and the various data sets 92, 94, 96, 98 included within or otherwise associated therewith.

Thus the invention provides systems, methods, and computer programming for processing data pertaining to a syndicated loan offering to be administered by a plurality of bookrunners, where for example the media comprise computer-readable code for causing a computer to receive data (or signals representing such data) identifying a plurality of invitees, where at least one of the invitees is or has been invited by each of a plurality of bookrunners to participate in a syndicated loan offering to be administered by the plurality of bookrunners. Subject to receipt of data indicating acceptance of such invitations by the invitees, the computer can be caused to identify accepting invitees as participants in the syndicated loan offering and associate with data identifying each participant a data-access authorization, where the data-access authorization associated with each respective participant is adapted to permit access by the respective participant to at least a deal data set and a bookrunner data set. The bookrunner data set can be accessible by the bookrunner that invited the participant to participate in the loan, by the respective participant, and by at least one other participant invited by the bookrunner to participate in the loan. The deal data set can be accessible by, for example, all participants participating in the syndicated loan offering.

The invention further provides such systems, methods, and apparatus where, for example, media according to the invention comprise computer-readable code for causing a computer to, in response to submission to a syndicated loan application server of a data-access authorization received in response to acceptance of an invitation from one of a plurality of bookrunners administering a syndicated loan offering to participate in the syndicated loan offering, either as a loan participant or as a loan arranger, enable access to data stored within at least one of a bookrunner data set and a deal data set, wherein the data-access authorization is adapted to permit access by the respective participant to at least a deal data set and a bookrunner data set, the bookrunner data set is accessible by the bookrunner that invited the participant to participate in the loan and by a plurality of loan participants invited by the bookrunner to participate in the loan, and the deal data is set accessible by all participants and all bookrunners participating in the syndicated loan offering.

The invention further provides systems, methods, and computer programming for processing data pertaining to a syndicated loan offering to be administered by a plurality of bookrunners in which, for example, media according to the invention can comprise computer-readable code for causing a computer to associate with data received by the computer data identifying the received data as associated with a syndicated loan offering and as associated with one of a plurality of bookrunners administering the syndicated loan offering; store the received data in persistent computer-readable memory, and, subject to verification of authority, allow access to the stored data by at least one of (a) the bookrunner with whom the stored data has been associated, and (b) a participant authorized on behalf of the bookrunner to access the data.

Figure 3:
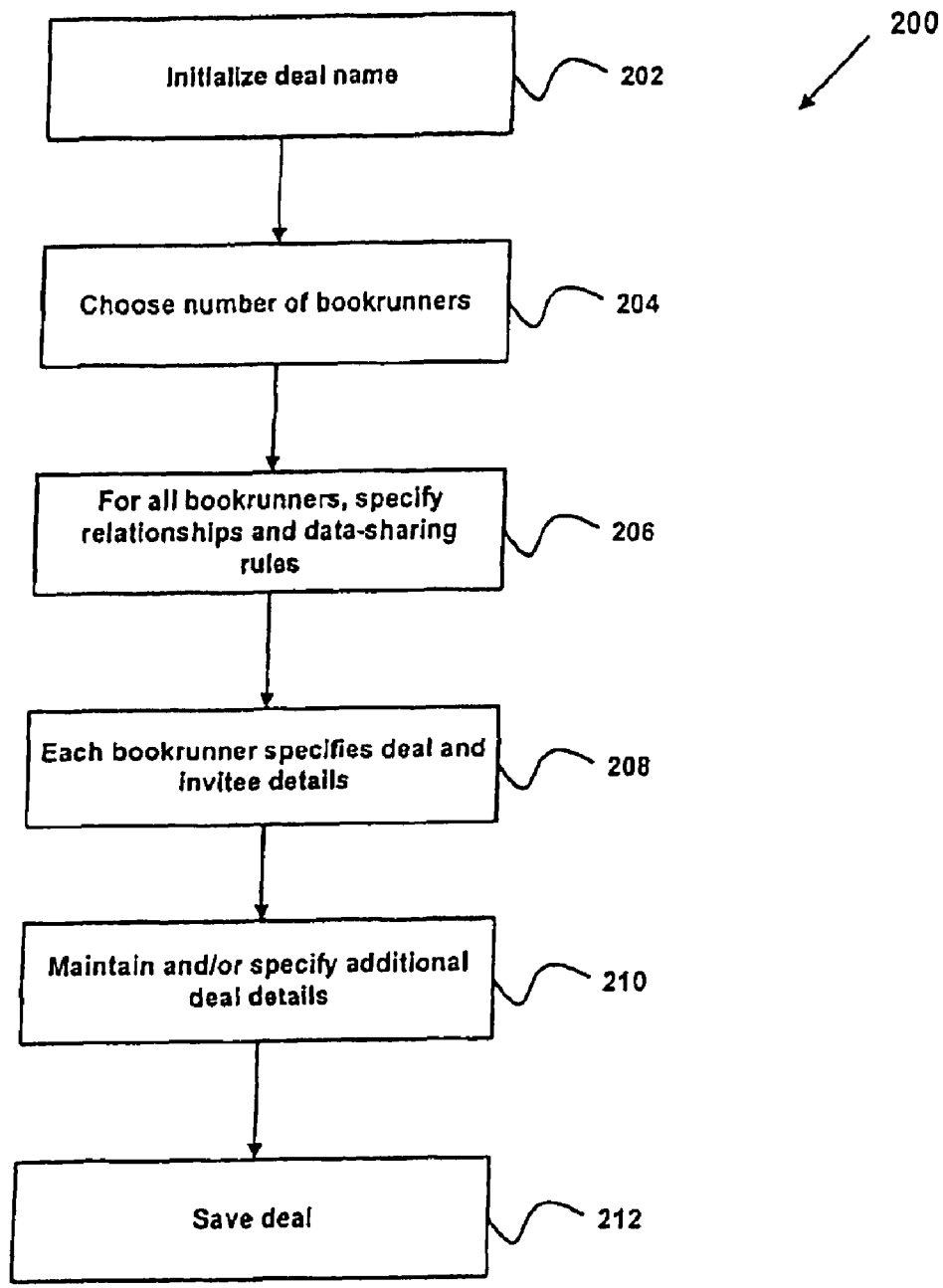
FIG. 3 is a schematic flow diagram of an embodiment of a process in accordance with the invention.

An example of a use of systems such as systems 100 of FIGS. 1 and 2 in implementing processes according to the invention is provided through the set-up, offering, and other administration of a syndicated loan. A process 200 for initiating a transaction such as the offering of a syndicated loan by multiple bookrunners 102, as initiated by a first such bookrunner (sometimes referred to as a "lead" bookrunner), is shown in FIG. 3. At 202 a bookrunner using a suitably-configured user system 121, including any suitable input/output systems such as keyboards, pointing devices, display screens, printers, and supporting software/hardware, starts or otherwise accesses an application hosted and running on his/her own user system 121, on a server 22, or on some combination thereof, according to a distributed-programming protocol. By providing suitably-adapted command input signals, the bookrunner invokes an input command state adapted to elicit and receive input of data required for or useful in initializing a data structure 14. For example, input of suitable commands can result in presentation on a display device associated with the bookrunner's user station 121, 102, 109 of an interactive user interface 600 such as that shown in FIG. 4A.

Following invocation of a suitable input command state, at 202 process 200 continues with initialization of the transaction, e.g., creation of a suitable data structure 14. Initialization of a loan or other transaction may involve, for example, providing a name or other identifier suitable for use in uniquely identifying the transaction and any associated data and/or users, such as bookrunners, arrangers, participants, etc., that may ultimately be identified. Further information can involve a transaction size (e.g., an amount of money to be lent, expressed in dollars and/or other currency(ies)), a desired number and types of tranches to be offered, and pools of due diligence and contact information.

For example, referring to interactive input interface 600 of FIG. 4A, interactive input items are provided in the form of drop-down menus 671, type-in input fields or boxes 672, "radio button" option menus 673, and option/selection boxes 674, such as are commonly provided in contemporary Windows™-style user interfaces. As will be understood by those skilled in the relevant arts, many other user input interfaces suitable for use in implementing embodiments of the invention, including for example those used in LINUX™ or DOS™ operating systems, are now commercially available, and doubtless others will hereafter be developed.

In the specific example provided in FIG. 4A, user interface 600 includes type-in input fields 672 for a deal name 601 such as a name or other identifier associated with a prospective borrower; radio-button option sets 673 for designation of a type of transaction data set to be initialized; for file names 677 corresponding to image data files for representations of borrower, sponsor, or project logos; for guarantor name 678, guarantor logo file name 679; and for borrower sector identifier 680. For inputting responsive information a user of a user system 121 can for example use a pointing device such as a mouse or trackball to select the box, and thereafter enter appropriate text character strings corresponding to file names or addresses to corresponding input data records, using a keyboard or other character input device.

For example, as a first step 202 (referring to FIGS. 3 and 4A), a user initializing a transaction data set 14 can select an option for a type of transaction to be initialized using radio button option set 673. Such a user can use a mouse or other pointing device to select one of the options, and thus cause corresponding data to be stored in an input buffer for further processing upon entry of a read execution command as a result of, for example, selection of "Next" command item 676. As will be well understood by those skilled in the relevant arts, selection of an option 673 can be used to set hard or over-ridable default parameters for setting up and/or populating a corresponding data set 14.

In input field 601, in the example shown, a user has typed a character string "ABC Limited", to be used as an identifier for the proposed transaction. Upon execution of an "Enter" or other suitable input command, as for example by selecting "Next" item 676, an application processor executing a suitably-configured input-gathering function will cause the input string "ABC Limited" to be read and stored in a data record in a data structure 14. The stored data can thereafter be used to, for example, identify a deal data set 94 and, based on the identity of the user setting up the transaction and further input choices provided by further input screens, optionally also one or more bookrunner data sets 96 associated with that deal data set.

Further, in the example shown, logo input fields 677, 679 are associated with "Browse" command boxes 681. As implemented in contemporary Windows™-type user interfaces, selection of a "Browse" command box 681 causes an application processor (e.g. processor 12 of FIG. 1) to cause the display associated with user system 121 to provide further interactive windows adapted for selection of a suitable file name using a hierarchical directory or file tree structure. Such functionality is well understood by those skilled in the relevant arts. Identification by a user of one or more logo file names can cause, as herein described, one or more logos to be displayed on subsequent input/output screens and on associated virtual and/or hard documents, and thus cause corresponding data to be placed into an input buffer for further processing upon entry of an execute command as a result of, for example, selection of "Next" command item 676.

Further, in the example shown, pull-down menus 671 are provided for a number of tranches 602 and for nationality and industry sector identifiers 603 associated with the borrower identified at 601. A bookrunner or other authorized user can use pull-down menus 671 to input data by employing a pointing device to select an arrow portion of the item to cause the input control processor to display a list of currently available input options, and to select one of the items of the list, thus causing corresponding data to be placed into an input buffer for further processing upon entry of an execute command as a result of, for example, selection of "Next" command item 676.

A number of tranches specified at 602 can be used for any purpose consistent with the purposes contemplated herein. For example, it is contemplated in one embodiment of the present invention that number of tranches 602 allows a user to specify the number of bookrunners that would be involved in a deal; each of such tranches may further be separable and saleable by the bookrunner associated with that tranche. Further uses will be immediately understood by those skilled in the relevant arts.

Borrower nationality 603 may allow the user to specify a jurisdiction in which the deal is primarily taking place, or for example in which country or other jurisdiction a borrower or other party is domiciled or conducts business. Further input fields may facilitate entry of data such as a relevant industry. For example, a given transaction may involve the chemical industry, as for example where the borrower is in the chemical industry.

Further, in the example shown, option/selection boxes 674 are provided for identification of additional bookrunners and/or other arrangers 604. By using a pointing device or other suitable input device, a user can select items from "Arrangers" or "Arrangers for this Deal" lists 604, and then select "add" or "remove" items 675 to add identifiers corresponding to desired arrangers to be placed in a buffer for further processing upon entry of an execute command as a result of, for example, selection of "Next" command item 676. Thus the initializing bookrunner can determine an initial number of arrangers to be involved in a transaction by placing a desired number of suitable arrangers in "Arrangers for this Deal" box 674. From amongst the Arrangers, the initializing bookrunner can nominate which other Arrangers are joint bookrunners.

Entry and/or selection of desired data to be used in initializing a desired transaction data set 14 using any or all of such input items and selection of "Next" command 676 causes input to be read from buffers associated with the respective boxes, and corresponding signals to be sent to the application processor, such as processor 12 in FIG. 1 for further processing as, for example, described herein.

As will be understood by those skilled in the relevant arts, the input processes described above are typical of common contemporary input processes, and can be applied similarly to input processes described throughout the remainder of the disclosure herein.

Thus, referring again to exemplary process 200 shown in FIG. 3, at 202 an initializing user, such as a first bookrunner or other arranger or administrator, can provide data representing a deal name or other identifier, as for example through use of a data input item 601, 672 of FIG. 4A.

At 204 the initializing user, who can be an arranger, initial bookrunner, or any designated authorized administrator or other user, can specify a desired total number of bookrunners (which number can include or exclude the initializing user) to be involved in offering or otherwise administering the proposed transaction, as for example using drop-down menu 671, 602 or input box items 672 shown in FIG. 4A. A total number of bookrunners authorized to set up and/or control the deal can be specified initially, as for example according to an initial agreement, and/or the total number can be flexible, such that one or more previously-appointed bookrunners can be authorized to appoint additional bookrunners as needed or desired, or bookrunners may be allowed, under desired conditions, to withdraw. A desired number of bookrunners can be set, and optionally later revised.

In some presently preferred embodiments of systems and processes according to the invention, it is assumed the initializing user is a bookrunner, and that once the deal has been initialized, the bookrunner structure is fixed.

At 206-210, an authorized party, such as the initializing bookrunner, can specify and/or modify details of the proposed transaction for each of the bookrunners identified at 204, and their corresponding levels of access to any shared data, which can for example include deal terms, due diligence data, and/or contact information, can be specified. Such relationship details can be designated by the controlling bookrunner by, for example, entering data corresponding to input items 682, 683, 684, 685, 686, 687, 688, 689, 690, 691, 692, 693. At 682 and 683 details of any tranches, including for example amounts and currency types, and names or other identifiers, can be provided.

For example, at 684, using radio button input options, some basic characteristics of data set 14 can be set. For example, options providing for the sharing of data among any authorized users, including bookrunners and other arrangers, invitees, participants, borrowers, etc., through various levels 92, 94, 96, 98 are provided. In the example shown, the controlling bookrunner (i.e., the bookrunner interfacing with the screen depicted) can determine at the extent to which contact information and/or invitee comments will be shared by joint bookrunners and consequentially, accessible by arrangers and the borrower/advisors.

As will be understood by those skilled in the relevant arts, commercial transactions such as syndicated loans may be divided into tranches, funds for which may be provided by a number of lenders. Tranche identifiers 683 set provide for entry of identifiers for each of the number of tranches that were specified by the user at 602. Tranche identifiers 683 may give each of those tranches a simple unique identifier such as using consecutive letters as shown. Tranche detail input fields 682 provide the ability to specify or select various details about each of the tranches. In the example shown, the user may specify size, in dollars or other currencies, for each tranche, and the currency of the tranche. Additional tranche details may be specified in the corresponding input fields.

At 685, bookrunners/other arrangers are provided the opportunity to arrange various face-to-face or other type meetings to discuss details of the proposal and any negotiable parameters thereof. Details of such meetings my, concurrently or at a later time, be distributed by the processor 12 or other application processor, on command of the entering arranger. For example, an authorized user can cause e-mail or other RSVP invitations, preferably in electronic format, to be sent to any desired lender invitees, to request their attendance at a borrower and/or bookrunner presentation of the deal.

Particularly important for most deals is a legal requirement to procure confidentiality agreements from invitees. As seen at 690, 691, systems according to the invention can provide a wide range of options for pre-determined confidentiality terms, and/or an editable template with over-rideable default terms can be provided (e.g. at 692) and/or one or more parties may be enabled to designate that their own, separately prepared document, be used (e.g., by making an appropriate selection at 691). Upon subsequent selection of "Next" item 694, for example, a further interface screen, adapted for acceptance of input identifying such agreements, can be displayed.

At 208 the various bookrunners can specify any desired parameters to be used in controlling their own portions of the book. For example, the bookrunners can specify a number of participants to be invited to underwrite the deal, the levels of their participation, and the levels and types of data to be shared between them; and thereby, among other tasks, designate parameters used in managing data set 14.

Figure 5A:
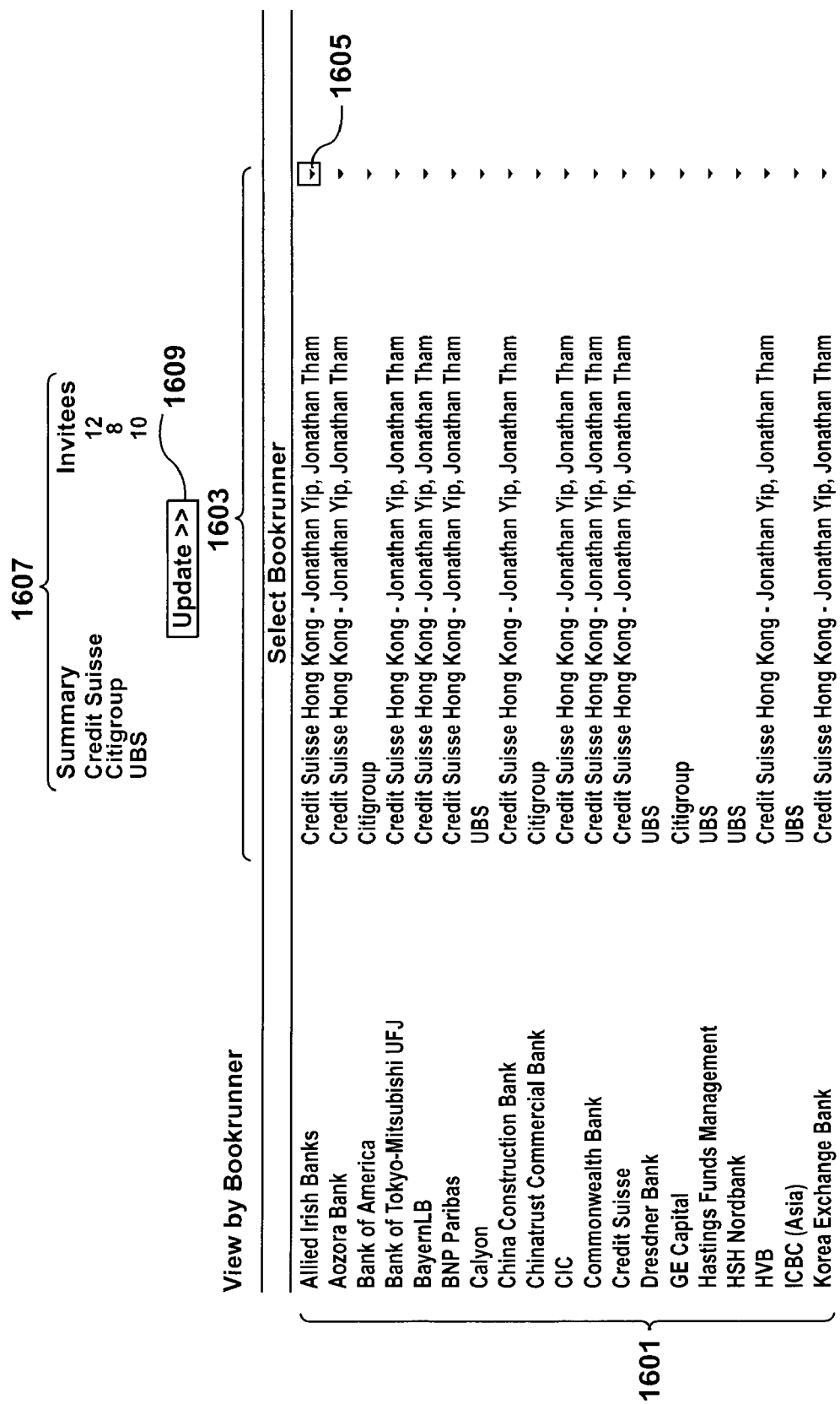

A screen suitable for eliciting input useable for designating individual lender invitees to participate in the proposed transaction, and to associate the invitees with particular bookrunners, is shown in FIG. 5A. In the embodiment shown in FIG. 5A, a pool of bookrunners to administer a proposed loan transaction and a pool of lenders to be invited to participate in the transaction has been identified, as for example by an initiating user who has initiated a transaction using processes such as those described above. A list of invitees is shown at 1601. At 1603, there is associated with each identified invitee a drop-down menu listing each currently-designated bookrunner. If a bookrunner has nominated distribution staff in more than one city, there is an additional option to associate the invitee with a particular syndication office (city) of the relevant bookrunner. The user using the interface can assign invitees to particular bookrunners by selecting one of pull down items 1605 and selecting the desired bookrunner to be associated with (e.g., to interact with) the respective invitee. In the example shown, for example, a number of invitee lenders, including Allied Irish Banks, Aozora Bank, Bayern LB, etc., are associated with bookrunner Credit Suisse Hong Kong, the main contacts/administrators (bookrunner contacts) of which are identified as Jonathan Yip and Jonathan Tham. Likewise, invitees Bank of America and GE Capital have been assigned to bookrunner Citigroup, etc. At 1607 a summary of the number of invitees assigned to or otherwise associated with the identified bookrunners is provided, as an aide to the administrator in distributing assignments. A usual practice is to have an equal number of invitees assigned each bookrunner.

When the user is satisfied with the assignments of the various invitees at 1601 to corresponding bookrunners at 1603, the user can select "Update" execution/command item 1609, and corresponding data held in associated buffers can be written to data structure 14, to update information stored therein accordingly.

When an invitee has been assigned to a bookrunner, and wishes to consider whether to accept participation in the transaction, the invitee can invoke suitably-adapted commands in order to access an interface comprising a summary of relevant data, drawn from various data sets 92, 94, 96, 98 of data structure 14. Such interface can present text and images representing such information, and/or can comprise links to data structures representing relevant documents and other data.

Figure 5B:
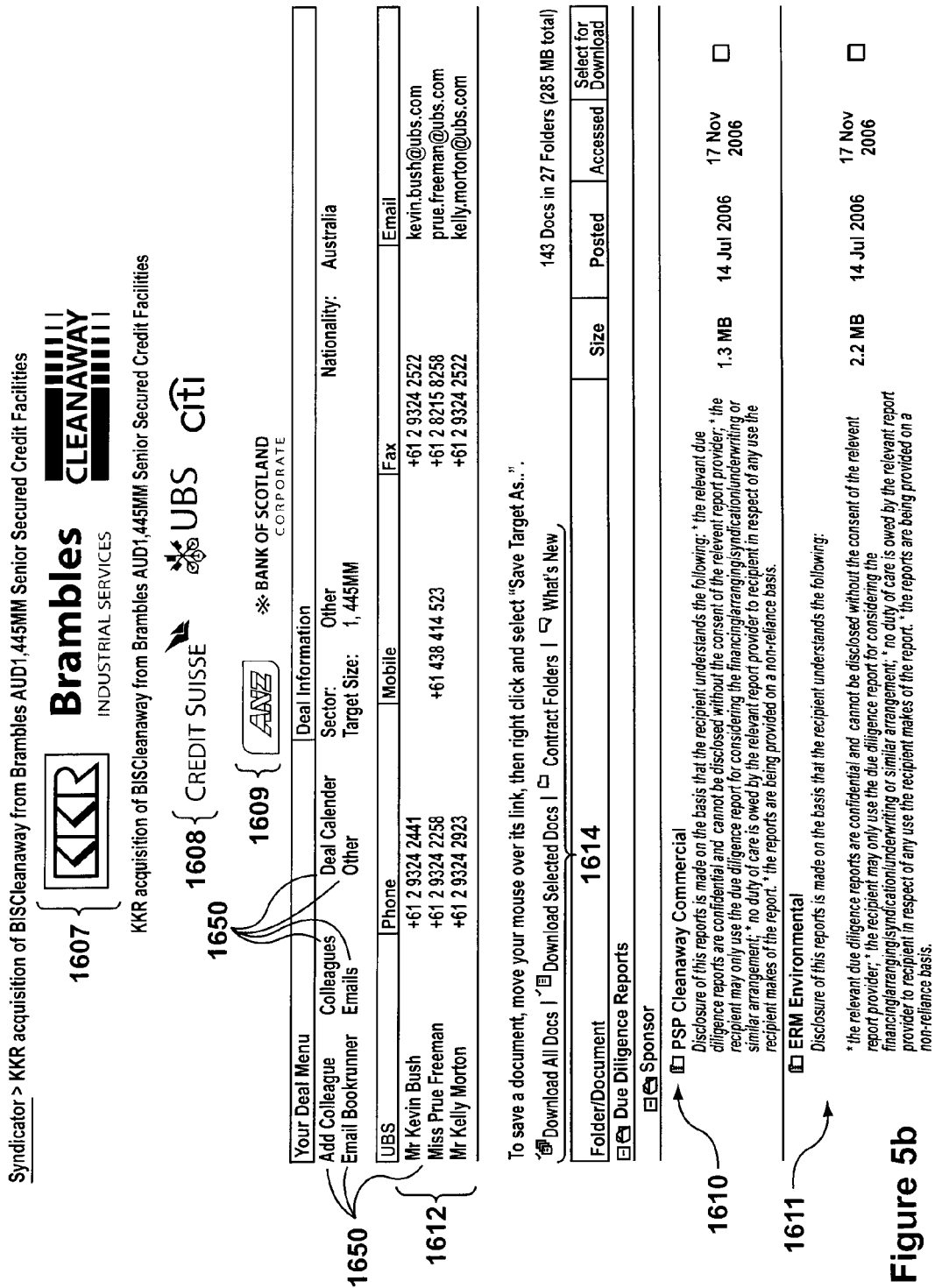

An example of an interface useful for allowing an invitee or other user to review summary information is shown in FIG. 5B. Signals useful in providing such an interface can be provided, for example, by a processor such as processor 12 of FIG. 1 executing suitably-configured software, for display on an output device associated with a user system 121, such as an invitee or participant user screen 104, 106. Such an interface can be accessed by a user of a system 121 upon entry of suitable authentication or authorization data, such as for example a suitable user identification code and password.

For example, a potential lender invited by a bookrunner to participate in a proposed syndicated loan transaction can receive a suitably configured communication, such as an e-mail or fax, generated by system 22 or other suitably-configured processor. Such communication(s) can provide for the secure transmission of data-access authorization means such as authorization codes, so that the targeted invitee can thereafter, using a user system 121, 104, 106, access an Internet web portal or other suitable interface process and invoke commands resulting in the display of an interface screen such as that shown in FIG. 5B. As will be understood by those skilled in the relevant arts, such data-access authorizations can expressly and/or implicitly identify both the requesting user (e.g., an invitee, participant, or bookrunner) and the bookrunner with whom the requesting user is associated.

Preferred systems according to the invention provide for the automatic generation of invitations extended to prospective lenders, using for example list merge processes such as mail-merge functions commonly available in contemporary word processing and spreadsheet programs. For example, suitably-flagged e-mail, facsimile, and/or other contact data can be retrieved from applicable portions of data structure(s) 14, and merged into a list for use in addressing e-mails, facsimiles, or other means for communicating invitations.

In such embodiments a user such as a bookrunner preparing such invitations, may be enabled to edit such invitations, either individually or in groups, prior to sending. Opportunities for such editing can be provided, for example, through the use of suitably-adapted user interface screens comprising both data input and command execution items.

Information displayed on an interface such as that shown in FIG. 5B can comprise any desired information, such as any information that may be useful to the invitee in determining whether to participate in the proposed transaction. Any or all of such information can, for example, be drawn from any one or more of levels 92, 94, 96, 98 of data structure(s) 14, and/or from public sources such as the Internet, based on criteria such as the association of the invitee accessing the screen with his/her assigned bookrunner, designations of data-sharing options made by the bookrunner or other system administrator using interfaces such as those shown in FIGS. 4C and 4D, etc., as represented by the association of suitable flags and other data with data identifying the individual invitee.

In the example shown in FIG. 5B, information including logos 1607, 1608, 1609, document images accessible through links 1610, 1611, 1614 and one or more of contact data sets associated with links 1612 can be stored in a highest-level (most widely accessible) data set 92. Other information, including for example any or all contact information and document images corresponding to related information can be stored in any one or more of corresponding deal data sets 94, bookrunner data sets 96, or private data sets 98.

Thus some or all of the information available to an invitee via an interface such as that shown in FIG. 5B may be accessible to all invitees, bookrunners, arrangers, borrowers, underwriters, lenders, service providers, and other participants and observers authorized to access system 22; or may be accessible only by the individual invitee, or by invitees assigned to the same bookrunner, etc.

Thus in various embodiments the invention provides systems, process, and computer-readable media useful for causing a computer to, in response to submission to a syndicated loan application server of a data-access authorization received in response to acceptance of an invitation from one of a plurality of bookrunners administering a syndicated loan offering to participate in the syndicated loan offering, either as a loan participant or as a loan arranger, access to data stored within at least one of a bookrunner data set and a deal data set; wherein the data-access authorization is adapted to permit access by the respective participant to at least a deal data set and a bookrunner data set, the bookrunner data set is accessible by the bookrunner that invited the participant to participate in the loan and by a plurality of loan participants invited by the bookrunner to participate in the loan, and the deal data is set accessible by all participants and all bookrunners participating in the syndicated loan offering.

In particular, the sharing of information with an invitee in such fashion can be restricted to situations in which the invitee has indicated an interest in participating in the transaction; that is, in which the invitee, by committing to participate, has been identified by the system as a loan participant.

As will be understood by those skilled in the relevant arts, data displayed or otherwise made available through an interface such as that shown in FIG. 5B can be drawn from any suitable source(s), and can be stored, accessed, and processed in any desired manner. For example, logos 1607, 1608, 1609 can be stored as image files in any suitable format, and inserted in the interface screen using java scripts or other suitable devices. Likewise, text items 1650, 1610, 1611, etc. can comprise hypertext links to additional data, either in character or image format, or in any other suitable format.

Thus the invention provides systems, and computer media such as suitably-configured software coding, useful for processing data pertaining to a syndicated loan offering or other transaction to be administered, for example, by a plurality of bookrunners, the medium comprising computer-readable code embodied therein for causing a computer to receive data signals (e.g., input requests from one or more user systems 121 identifying a plurality of invitees, at least one of the invitees invited by each of a plurality of bookrunners to participate in a syndicated loan offering to be administered by the plurality of bookrunners; and, subject to receipt of data indicating acceptance of such invitations by the invitees, identify accepting invitees as participants in the syndicated loan offering and associate with data identifying each participant a data-access authorization. The data-access authorization can be associated with each respective participant adapted to permit access by the respective participant to at least a deal data set and a bookrunner data set, where the bookrunner data set is accessible by the bookrunner that invited the participant to participate in the loan, by the respective participant, and by at least one other participant invited by the bookrunner to participate in the loan; and the deal data set is accessible by all participants participating in the syndicated loan offering.

Thus too the invention provides such computer-readable media adapted for causing a computer to, subject to verification of data representing a request from an authorized participant, provide access to data stored within at least one of a bookrunner data set and a deal data set.

Figure 6:
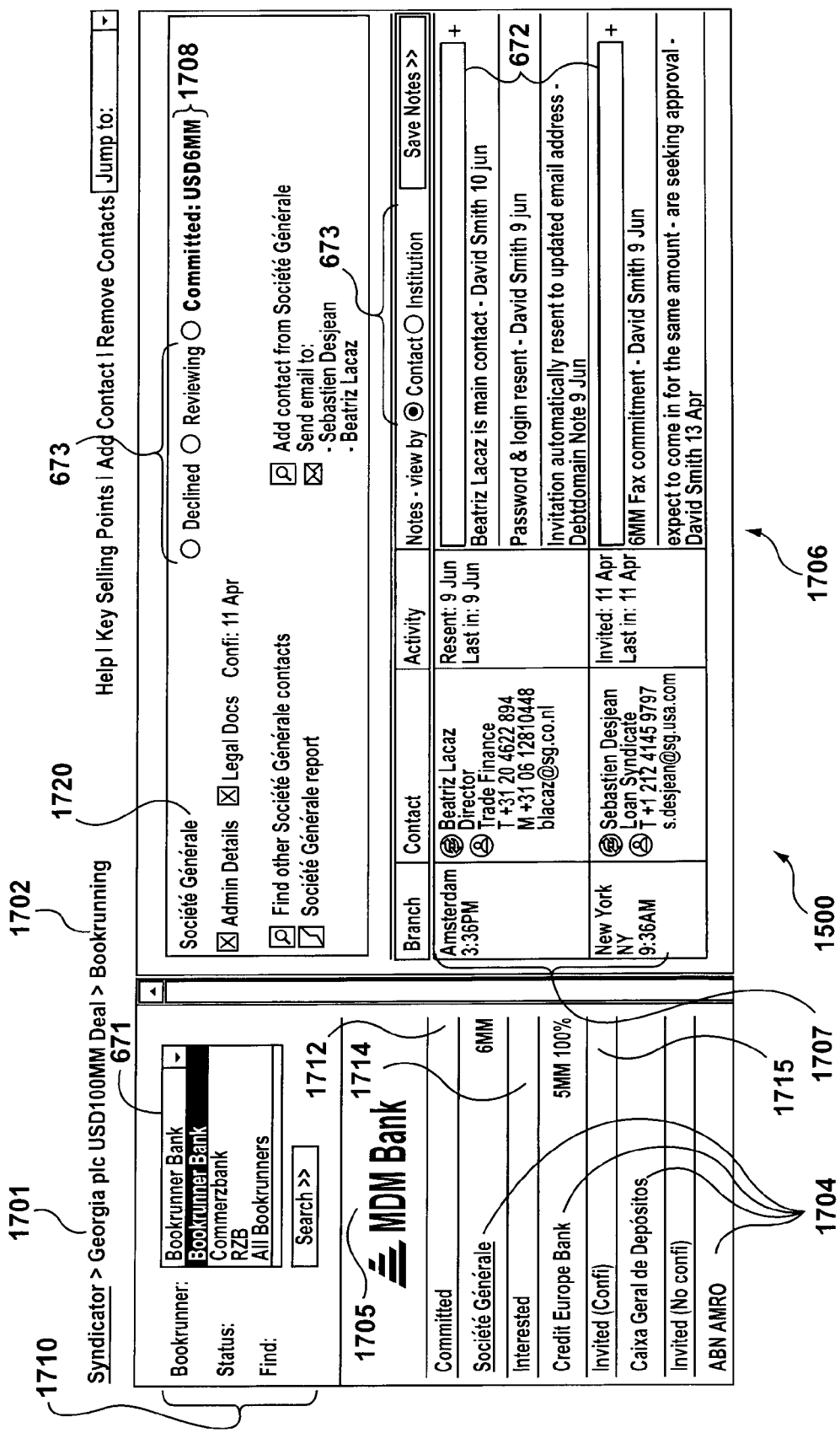
Figure 7:
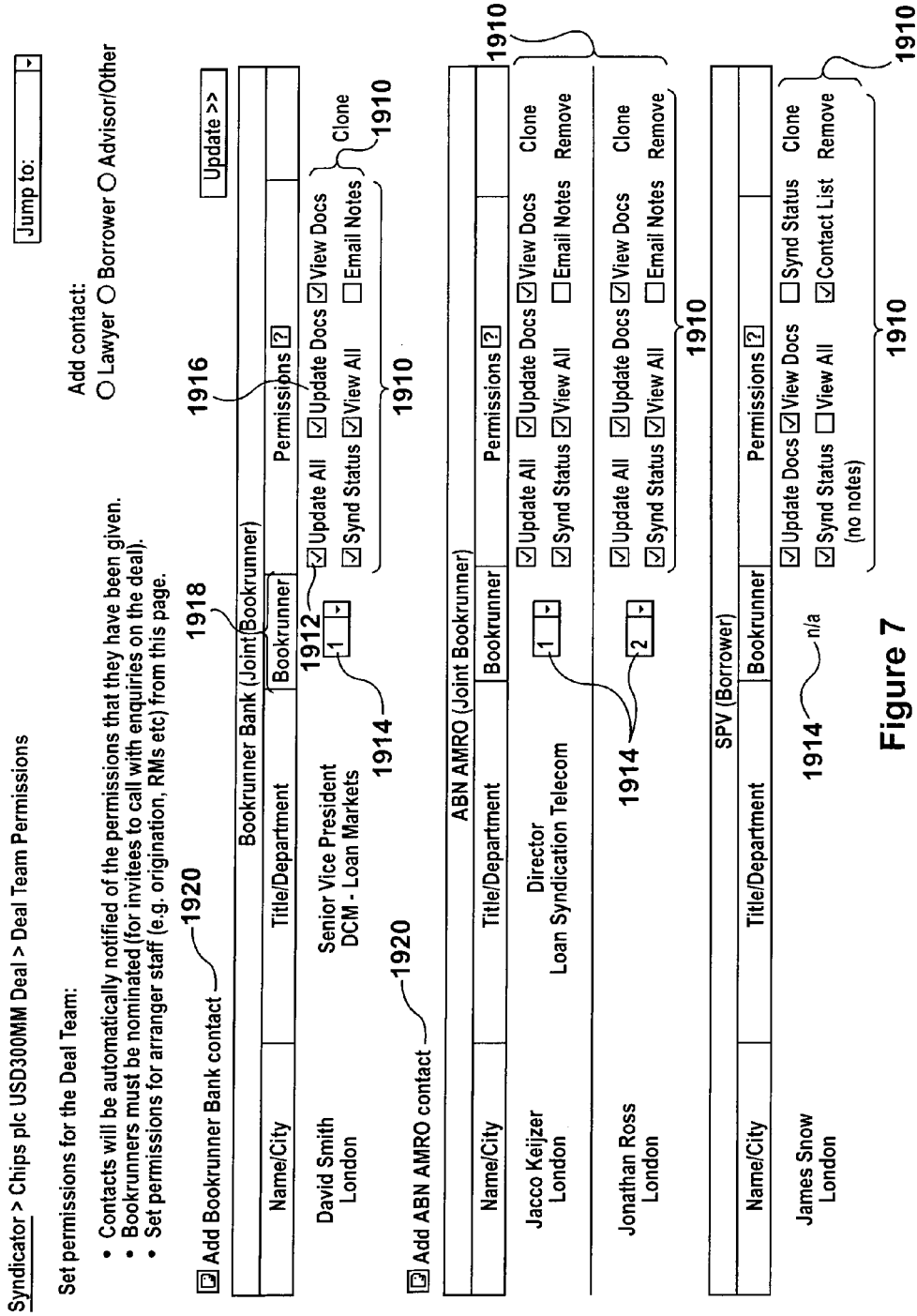

FIGS. 6 and 7 show exemplary user interfaces for viewing and managing bookrunner/invitee/participant information and relationships in accordance with an embodiment of the present invention. Such interfaces can be referred to as "Bookrunning Pages". For purposes of illustration, the interface screens shown in FIGS. 6 and 7 comprise several of the same types of input devices shown in FIGS. 4A-D and described above.

Screen 1500 of FIG. 6 echoes a previously-designated deal identifier at 1701, and confirms at 1702 that the syndicated loan data management application is operating in a bookrunner administration state. At 1705 confirmation is provided, in the form of a graphic representation of the bookrunner's logo, of the identity of the bookrunner currently using the system to manage invitees and/or loan participants. Below confirmation 1705 is provided a listing of invitees assigned to the bookrunner and an indication of their status with respect to the proposed loan transaction. For example, an invitee "Société Générale" is indicated to have committed to the transaction, and therefore to have become a participant, to the extent of committing 6 million dollars (or other applicable currency) to the deal. The actual amount lent by the participant can depend on what is allocated by the bookrunner at the end of the deal; in the case of an oversubscribed position it can be less than the commitment amount of 6 million. The total amount of the deal is indicated at 1701 to be 100 million dollars. Invitee "Credit Europe Bank" has indicated an interest in providing up to 5 million dollars of the loan. Invitee "Caixa Geral de Depósitos" has been invited and has accepted the confidentiality agreement, while "ABN AMRO" has been invited, but has not accepted the confidentiality agreement.

Items 1704 identifying the various invitees can be provided in the form of hypertext links, selection of which by the bookrunner user, as will be understood by those skilled in the relevant arts, results in display in area 1706 of data related to the selected invitee. For example, in the example shown, item 1704 corresponding to participant "Société Générale" has been selected, resulting in display of a number of information items pertaining to the deal status of that participant, and links to further data relating to that invitee/participant. At 1708, boldface script is used to confirm that the invitee/participant has committed to provide funds in the amount 6 million dollars (and therefore has been accorded the status of a loan participant). Radio button input options 673 enable the reviewing bookrunner to change the status of the participant or an invitee. At 1707, information pertaining to contacts associated with the participant is provided, with fields 672 for modification of data. Likewise, one or more of the displayed text items can be provided in the form of hypertext links, selection of which can result in display of an interactive interface adapted for modification of corresponding participant/invitee data.

When the bookrunner information interface of FIG. 6 is initially presented to a user, the right-hand side of the user interface comprising data items 1704, 1705 may be blank. The user may use bookrunner selector, status selector, and find selector 1710 to populate the right-hand side of the screen. The bookrunner selector is available on multiple bookrunner deals and where invited contacts are viewable by all bookrunners. The Bookrunner selector allows the user to choose one or all bookrunners or a particular bookrunner for a designated transaction. The selection in using bookrunner selector 1710 specifies the various invitees, participants, and bookrunners whose information may be viewable on the right-hand side of the screen and may be shown in committed list 1712, interested list 1714, or invited list(s) 1715.

Status selector 1710 allows the user to specify whether they would like to be able to see all of the invitees for the one or more bookrunners selected, or those that have declined, committed, or probable commitments, have been invited, or all excluding those that have declined. These options are meant to be exemplary only and other statuses for invitees may be possible in other embodiments, and may be selectable using status selector 1710. Find selector 1710 may invoke a list that allows a user to select a term defined, or may be, for example a text box that allows a user to specify a search for an invitee contact name or invitee bank name. For example, a user may specify they would like to find a given contact. The right-hand side 1706 of the user interface may be populated only with the invitee that has the contact that was entered in the find selector 1710. As a further example, a user may select to see all bookrunners using bookrunner selector 1710, invitees of all statuses using status the selector, and may leave the find selector blank. This would result in the right-hand side of the screen being populated with one of the bookrunners or participants in the deal. This would also result in committed list 1712 being populated as shown in FIG. 6, probable commitment list 1714 being populated as shown, and invited list 1715 being populated as shown.

Participant or invitee information field 1706 may provide information related to the participant/invitee that is selected from committed list 1712, interested list 1714, or invited list 1715, including specified in participant/invitee name 1720. This may include addresses of the invitee or participant, contact information, subsidiaries and related parties, and other information. It is to be understood that although multiple pieces of information are shown in participant/invitee field 1706, these are exemplary only and there may be other information that is presented or some of the present information may be removed.

At 210 in process 200, any additional deal details can be specified, and/or relationships between bookrunners, arrangers, invitees, and participants can be revisited or modified. Data relating to such details may for example include the extent of sharing of contacts and comments among multiple bookrunners. Deal details may further include, for example: (1) Specifying the positions of bookrunners and arrangers. This can be important where, for example, it is advantageous to identify a senior bookrunner by, for example, placing the bank's logo in a prominent (top left side) or otherwise noticeable position on a user interface screen, so that others may easily identify that bookrunner as the senior "prestigious" bookrunner.

(2) The manner in and terms under which confidentiality and other agreements are to be executed. This is important as bookrunners or other parties typically owe a legal duty of confidentiality to their borrower clients etc.

(3) The industry sector and nationality of the borrower. This can be useful so that, for example, invitees can have a quick idea of the where borrowed funds intend to be used as each bank has credit limits based on sector and borrower nationality. Deal details may be specified by a user or by system 22.

At 212 the deal, and all details that have been provided, can be saved into a database or storage such as data structure 14, and the databases or data sets stored in association therewith. The information collected in process 200 having been saved, an information set 14 may be created after 212, and updated, modified, and manipulated as desired for completing the deal.

It is to be understood processes, such as process 200, in accordance with the invention may proceed wholly or partially automatically, or may proceed wholly or partially as a result of a user interacting with system 100, or both. A user may, for example click a mouse button, select an icon or a command button, or provide any other input to system 100; or a processor such as processor 12 of FIG. 1 may use any input and/or default data to automatically initiate or complete various processes and process steps.

Thus process 200 can begin, for example, with identification of a loan to be syndicated and of a first bookrunner 103. Having been established as such, a bookrunner 103 can take a variety of actions, including for example authorization of any number of additional bookrunners 105, 109. Bookrunner(s) 102 can for example contact one or more potential participants 104 (i.e., "invitees"), as indicated at 101 (FIG. 2), and invite them to take part in underwriting and/or participating in the proposed loan. Bookrunner(s) 102 may further contact invitees or participants by any suitable means, including for example telephone, SMS, text messaging, e-mail, fax, letter, or other means.

Invitees who commit to a deal can be granted, by their respective inviting bookrunners 102, status as participants 106, as indicated at 111. Participant status can provide, for example, authority for various levels of access to databases of data representing documents and other information associated with the proposed deal or loan.

For example, as shown in FIG. 2, participants 106 can be granted access to (i) database(s) 14, 108, associated with and controlled by a respective bookrunner 102; and/or (ii) to shared database(s) 14, 110. Each of databases 108, 110 can contain data representing a wide variety of information associated with proposed loans, including for example all relevant documents, and all regulatory and accounting information.

The interface such as that shown in FIG. 7 can be used to enable an authorized user such as a bookrunner to set and modify, or otherwise manage, authorizations, or permissions, for various bookrunners, arrangers and other deal parties to access data stored in data structure(s) 14, and the manner in which such information is accessed. For example, in the embodiment shown in FIG. 7, an authorized bookrunner is enabled to review and modify permissions 1910 for fellow bookrunners "Bookrunner Bank" and "ABN AMRO", and for borrower "SPV".

Among permissions the authorized user is enabled to set or modify, in the example shown, are privileges related to "Update All", "Update Docs", "View Docs", "Synd Status", "View All,", and "Email Notes", with respect to one or more bookrunners. The corresponding permissions can be toggled on or off, or otherwise set by, for example, selecting respective "check" box authorizations boxes.

For example, enabling "Update All" permission 1912 by, for example, selecting the check box item associated with the descriptive text "Update All" sets appropriate data flags for granting the corresponding participant, bookrunner, or other party to edit or revise all data, documentary or otherwise the party is authorized to access; for example, all documents associated with a particular deal. Enabling "Update Docs" permission gives the corresponding party to update documents related to the deal, such as proposed agreements, prospectuses, etc. "Synd Status" enables the party to access the Syndication Status Report in FIG. 9a.

"Bookrunner" pulldown menus 1914 are provided for identification of arranger contacts who are to be assigned distribution roles; that is, to be designated as bookrunners that are visible to invited contacts. For example, a nominated individual, usually as a loan sales person, may be given a number which it will be determine there ranking for invitees to contact. Usually, not all arranger contacts will have such roles.

The user of an interface such as that shown in FIG. 7 can be enabled to perform further management functions through provision of, for example, links 1920 to interface screens or other functionality related to bookrunner contacts. For example, selecting hypertext link 1920 "Add Bookrunner Bank contact" can cause a further interactive interface to be displayed, along with functionality allowing the authorized user to add contacts, invitees, or others to the list of such contacts, etc., associated with the corresponding bookrunner.

In some embodiments, individual participants 106 are associated solely with individual bookrunners 102, as shown in the FIG. 3. In such embodiments the individual participants 106 may for example be authorized to access only bookrunner databases 108 controlled by their corresponding bookrunners. In other embodiments individual participants 106 may be associated with multiple bookrunners 102, and optionally authorized to access bookrunner databases 108 controlled by each of the corresponding multiple bookrunners.

Non-participating users 107, which can include for example service providers and other interested parties such as borrowers, lenders, lawyers, auditors, regulators, etc., can be granted authority to access one or more bookrunner databases 102 and/or shared databases 108, or any or all of corresponding data sets 92, 94, 96, 98.

A significant advantage provided by systems and processes according to the invention is that of enabling consolidated reporting of syndication status by multiple bookrunners and widespread reviewing of such syndication status reports by multiple parties, including for example by arrangers 106, bookrunners 102 and the borrower. For example, each of arrangers 106 and bookrunners 102 can be enabled to access, and contribute to, a combined syndication status report, so that the exact status of the loan proposal may be reviewed at any moment, in real time, by any authorized bookrunner, arranger, or other system user. Administrative status reports, participant commitment reports, and reports comprising statistics related to reasons cited by invitees for declining to participate in loan offerings are further examples of reports that can be built, modified, and reviewed by multiple parties in accordance with the invention. Such reports can be maintained and stored wholly or partially in shared database 110, and/or in relevant portions in one or more bookrunner databases 108.

A particularly advantageous report enabled by the invention is the combined loan syndication status report. The provision of such reports in accordance with the invention enables the exact status of the loan proposal to be reviewed at any moment, in real time, by any authorized bookrunner, arranger, or other authorized user of a data storage/transaction processing system according to the invention.

Examples of combined loan syndication status reports in accordance with the invention are shown in FIGS. 9A-9F. Access to displays showing such reports, and/or to image or hard-copy versions of such a report, may be gained through user interfaces such as that shown in FIG. 8.

An interface such as that shown in FIG. 8 may be provided to a user or users of a system 100 at any point in the initiation or administration of a transaction such as a syndicated loan offering. The number and types of options presented by the interface can be made dependent upon the identity of or authorizations associated with the viewing user, and/or the status of the corresponding deal. In the example shown, interface 3500 has been assembled by a processor 12 upon the request of and for presentation to a bookrunner following the initialization of a syndicated loan transaction. Processing options offered to the user include various activities, such as originating, modifying, or otherwise managing data and processes related to setting up the loan, and identifying and inviting prospective participants to participate in the offering; access to various reports, including for example the status of the syndicated transaction, reports related to bookrunning or contact activities, reports on the confidentiality status of various arrangers, borrowers, and participants, and access to support documentation; and other activities, including the creation of new deals/deal data structures by duplicating existing information sets, archiving documents, checking e-mail or other communications patterns, etc.

Selection of item 3501 "Syndication Status" of interface 3500 can result in the presentation of a report interface, or other output, comprising data related to the status of the syndicated offering. For example, selection of an item 3501 shown in FIG. 8 by an authorized user can cause processor 12 to access all applicable data structures 14, including any applicable data sets 92, 94, 96, 98, to gather data responsive to the request at the requested time, and to present, as shown in FIG. 9A, a report summarizing at 3002 the number of committed participants and the level of their commitment (i.e., the monetary value of their individual and/or combined commitments); at 3004 the number of invited participants and their status; at 3006 the identities of designated bookrunners and other arrangers, and the amount of funds committed by them and/or participants associated with them; at 3008 the identities and other information pertaining to committed participants, including, at 3009, the date upon which such participants executed confidentiality agreements, the identity of the responsible bookrunner; at 3010 invitees believed to be likely to commit; and at 3012 participants who have not yet been fully processed as committed, but who have signed confidentiality agreements, verbally agreed to participate, etc.

A draft allocations tool is shown in FIG. 9B. FIG. 9B can be accessed by an authorized user by, for example, activating a suitably-configured hypertext link provided in an interface such as those shown in either of FIG. 8 or 9A.

The transaction report shown in FIG. 9B can be referred to as an Allocation Report. Commitment levels; method of acceptance of invitation; time and date of acceptance; title, role, or status; and deal status are shown at 3602, 3604, 3606, 3608, 3609, and 3610, respectively. An authorized viewer using such an interface can change corresponding data using input fields 672, 673, etc., as described. In the example shown in FIG. 9B, the report shows both commitment and allocation levels, which need not be the same. For example, in FIG. 9B arrangers "Commerzbank", "RZB", and "Standard Bank" have each committed to 7.5 million US dollars, but have been allocated only 7, 3, and 7 million US dollars, respectively.

Further examples of combined transaction status reports referred to as work flow tool to draft allocations, e.g. View Allocations and Notify Allocations respectively, are shown in FIGS. 9C-9D. FIG. 9C can be accessed by an authorized user by, for example, activating a suitably-configured hypertext link provided in an interface such as those shown in either of FIG. 8, 9A, or 9B. The report shown in FIG. 9C summarizes allocation data such as that shown in FIG. 9B, but in optionally uneditable format.

A further example of a combined transaction status report is shown in FIG. 9D. The interface shown in FIG. 9D can be accessed by an authorized user by, for example, activating a suitably-configured hypertext link provided in an interface such as those shown in either of FIG. 8, 9A, or 9B. The interface/report shown in FIG. 9D summarizes currently-selected options for methods of notifying lenders and other system users of deal allocations, and at 3702, 3704 allows modification of those options. As shown at 3706, security of allocation records can be protected though the use of appropriately-configured access codes, which may the same as or different than those used by the user for access to other data and/or functionality stored on system 100.

A further example of a combined transaction status report is shown in FIG. 9E. FIG. 9E can be accessed by an authorized user by, for example, activating a suitably-configured hypertext link provided in an interface such as those shown in either of FIG. 8 or 9A.

The transaction report shown in FIG. 9E can be referred to as a Commitment Report. Lender name; contact identifiers; commitment levels; time and date of acceptance; title, role, or status; fee information, administrative and tax form information, with hypertext links to further information, are provided 3802, 3804, 3806, 3808, 3809, 3610, and 3812 respectively. In the example shown, commitment data is sorted according to loan tranche. An authorized viewer using such an interface can change corresponding data using input fields by, for example, selecting any of the corresponding links and using input devices 672, 673, etc., as described from subsequently-presented interactive interfaces.

Figure 9F:
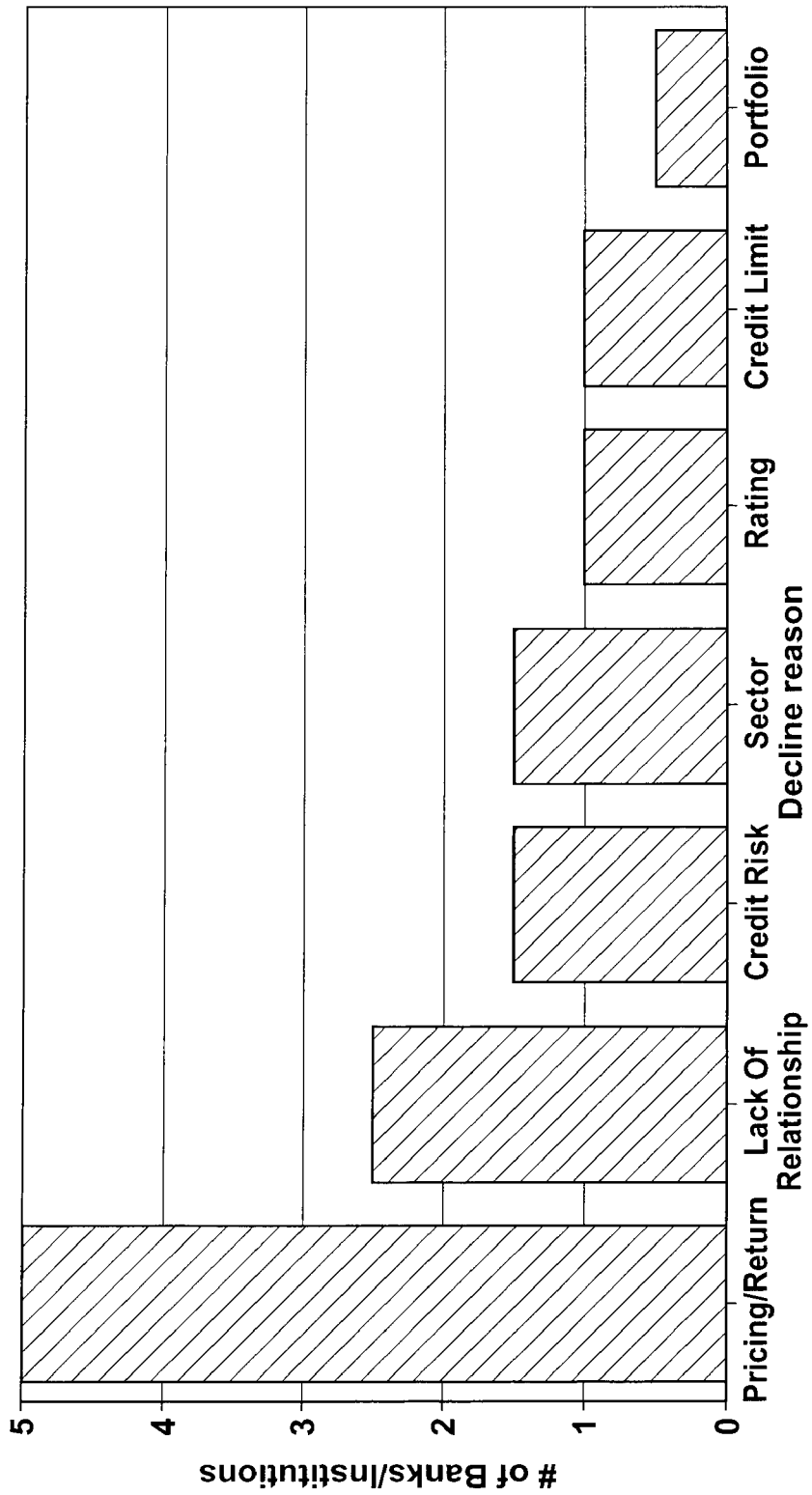

A further example of a combined transaction status report is shown in FIG. 9F. FIG. 9F can be accessed by an authorized user by, for example, activating a suitably-configured hypertext link provided in an interface such as those shown in either of FIG. 8 or 9A.

The transaction report shown in FIG. 9F shows data indicating reasons given by invitees who have declined to participate in the proposed transaction for declining to participate. As will be understood by those skilled in the relevant arts, declining invitees can be provided with suitably-adapted input devices, such as radio button option lists, which enable them to select one or more reasons for declining to participate. At the request of a curious bookrunner, borrower, or other party, processor 12 can access and collate such data, and assemble suitable output data for the presentation of an appropriate screen, such as that shown in the Figure.

The collection and presentation of data representing reasons that prospective lenders have declined to participate in a syndicated loan transaction can be help arrangers, borrowers, and others to understand why deals have been declined, which may, in turn, lead for example to repricing or restructuring of current or subsequent deals, and thus can improve the efficiency and effectiveness of the syndicated loan process.

Reports such as those shown in FIGS. 9A-9F can be particularly useful because they are available, in uniform or specially-tailored formats, to any and all authorized parties, and because they automatically pull together information that previously may only have been available on separate client-server sole bookrunner systems; they therefore make available consolidated information provided by a wide variety of participants and other users, and current to the moment of the request. They thus aid immeasurably in the understanding of the current overall status of a transaction, and in the identification of next steps to be undertaken in order to further the transaction. In particular, it has been found advantageous to make such reports available, via network interface, to borrowers.

Such reports eliminate or reduce great amounts of paper work and communications times, and enable more rapid and informed decision making.

A further particularly advantageous feature of the assembly and provision of such information is that, when stored, processed, and assembled in the manner described it may be made available to borrowers, lenders, arrangers, and others in a wide variety of convenient or useful formats: as graphic and/or active content displayed on a screen, in hard copy as printed reports, as image data in .pdf or other files, and as data formatted for use by third-party applications such as spreadsheets. For example, data use to compile such reports can be made available to users in Excel™ format, etc.

A further advantage is that such information can be used in the automated generation of printed closing documents, and other documents necessary for completing and/or memorializing a transaction.

Thus the invention provides, among other features, processes and computer-executable media useful for processing data pertaining to syndicated loan offerings to be administered by a plurality of bookrunners, the media comprising computer-readable code embodied therein for causing a computer to, upon entry of a suitably-adapted execution command from a borrower input system such as a user system 121 operated by an authorized borrower, access data corresponding to the status of a plurality of criteria relating to the offering of the syndicated loan, access to which data is controlled by a plurality of bookrunners administering the syndicated loan offering; and to display on an output device associated with the borrower input system, in human-readable form, information indicating said status.

The invention further provides processes and computer-executable media useful for causing a computer, upon entry of an execution command from a borrower or other input system, output data corresponding to the status of a plurality of criteria relating to the offering of the syndicated loan in a spreadsheet format.

Examples of administrative status reports provided by a system 100 in accordance with the invention are provided in FIGS. 10A-10D. Access to displays or other forms of such reports may be gained through a user interface such as that shown in FIG. 8. Invocation of a suitably-configured command by an authorized user can result, for example, in display of information such as that shown in FIG. 10A.

Administrative details reports such as that shown in FIG. 10A can summarize data useful, for example in contacting parties responsible for attending to various tasks and/or administrative details of a transaction, or doing so on behalf of individual parties. For example, in FIG. 10A administrative details relating to a participant or borrower "National City Funds" are shown, including contact information for a booking office, publicity information, and payment instructions, etc. Further information on a number of details is available via hypertext links 3520.

For example, activation of link 3522 "Payment Instructions" can result in the presentation of an interface such as that shown in FIG. 10B, which provides details of payment instructions for a borrower "National City Funds." Input items 3504 adapted for designation of payment currency and other information is presented. Additional details may be entered, or existing details deleted or modified, by an authorized viewer.

As previously mentioned, a further advantage offered by the invention is the use of data stored in the various data sets 92, 94, 96, 98, etc., of data structure(s) 14 is that such information can be used in the automated generation of printed closing documents, and other documents necessary for completing and/or memorializing a transaction. For example, contact information including addresses, commitment amounts, confidentiality terms, fee agreements, and the like can be used to construct contracts, insurance forms, accounting forms, and various reports for signature and authentication, etc.

A particularly useful feature of such functionality is the storage in any of the various data structure(s) 14 of document templates comprising data representing text and formatting data suitable for the printing of standardized language, into which data strings representing deal- or party-specific information can be merged, so that at display and/or printing complete, custom-drafted documents can be prepared.

Thus in various embodiments the invention provides computer-readable media, systems, and processes for the display on an output device associated with at least one client input system 121, in human-readable form, of information pertaining to at least one syndicated loan offering to be administered by a plurality of bookrunners, and at least one input item adapted to facilitate input by the user of data corresponding to at least one type of solicited input data; and, upon entry of an input execution command by a user of the at least one client input system, the reading data input by the user corresponding to the at least one type of solicited input data; upon entry of a document assembly execution command by a user of the same or another client input system, the compilation of a document output data set, the document output data set compiled using the input data corresponding to the at least one type of solicited input data, and at least one document template data set, the document template data set comprising data representing standard text to be incorporated as a part of one or more documents useful in closing the syndicated loan offering; and the compiled document data set adapted for use by at least one output device to provide at least one human-readable rendering of each of a plurality of such documents.

That is, data corresponding to proforma templates can be provided, and populated at or before output with details of participants and various aspects of the deal at issue, including closing instructions and terms consistent with them. Such forms can be, for example, standardized for preparation according to one or more specific currencies during the course of a deal, with, where appropriate, automatic translation of amounts stated in other currencies in accordance with any desired pre-stored benchmarks, or benchmarks retrieved from external sources at the time of document preparation.

Document output data sets according to such aspects of the invention can be compiled using, in addition to such input data and such document template data sets, data corresponding to solicited input data provided by users other than the user who provided the document assembly execution command.

Such documents can be output in editable format (e.g., in format suitable for processing using a commercial word processing program such as Microsoft Word™, or in image format such as editable or non-editable .pdf or .jpeg form.

As previously noted, the invention further provides for the presentation on various interface and other display screens, and on various output reports, of logos and other images associated with various parties to transactions, including for example lenders, arrangers, and administrators.

As is understood by those familiar with the implementation of commercial transactions such as syndicated loans, there can be significant perceived value in the relative placement of logos associated with various entities in display screens, reports, and the like. The invention enables unprecedented flexibility in the placement of logos, and particularly the relative placement of individual logos within groups of simultaneously-displayed logos, on displays, reports, etc.

For example, as previously described a plurality of graphic display items, e.g., logos, related to various parties associated with a syndicated loan offering are shown in the bookrunner summary interface is shown in FIG. 5B. In a typical commercial transaction of this type, the most important of the arrangers involved, or those having the most leverage within the context of the given transaction, are accorded the most prestigious display location: usually, the highest, rightmost location. In the example shown in FIG. 5B, for example, the most important parties are given positions in topmost row 1607, and the largest image size. The invention enables authorized users to specify the placement of logos on such displays, and in other displays and reports, with large degree of flexibility: both the up-down and left-right positioning, and, in some embodiments, the sizing of such logos.

Thus the invention provides methods, systems, and computer programming for causing a computer to display, in human-readable or otherwise discernable form, information pertaining to a transaction such as a syndicated loan offering to be administered by a plurality of bookrunners, the information comprising at least one graphic display item such as a graphic representation of a logo identifying each of a plurality of parties, such as lenders, borrowers, or underwriters, associated with the syndicated loan offering; wherein the plurality of graphic display items is arrangeable in at least a two-dimensional array, the relative position of the graphical display items within at least one of the dimensions selectable by an administrator of the syndicated loan offering.

As previously mentioned, such graphic data can be drawn from any suitable local or remote source(s), and can be stored, accessed, and processed in any desired manner. For example, data representing logos can be stored as image files in any suitable format, and inserted in the interface screen using java scripts or other suitable devices.

Figure 11:
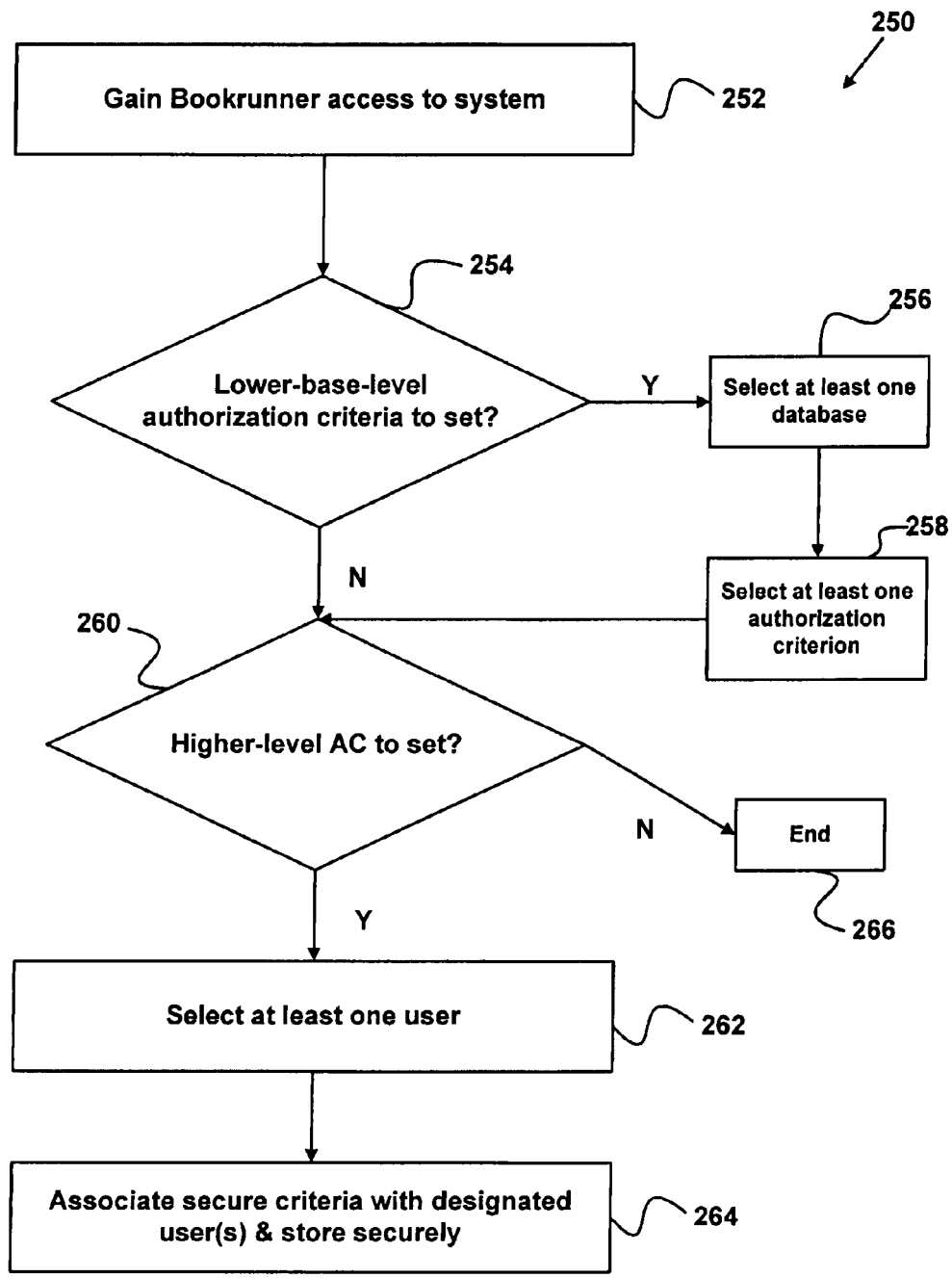
FIGS. 11 and 12 are schematic flow diagrams of embodiments of processes in accordance with the invention.

FIG. 11 is a schematic flow diagram of an embodiment 250 of a process for setting data-access authorizations in accordance with the invention, such authorizations being useful, for example, for granting or otherwise controlling access by invitees, participants, borrowers, bookrunners, and other users of systems 100 to desired or appropriate portions of data structure(s) 14.

At 252 an authorized user such as a lead or initiating bookrunner, or other arranger, logs on or otherwise gains access to the syndicated loan processing system 100. Such a user may be, for example, an administrator of system 100, or a bookrunner seeking to set authorization levels for participants and/or invitees in the list of prospective lenders assigned to the bookrunner. Access may be gained, for example, through the use of an interactive login screen where the user is required to provide a name and password to access system 100. In addition to or in lieu of such well-understood login processes, other ways of gaining access to a system, such as through digital signatures, fingerprint scanning, and/or the use of other biometrics or security devices may be used, and are considered within the scope of the present invention.

If at 254 the authorized user determines that there are lower-level data set authorizations to be set (e.g., to deal data sets or global data sets), then at 256 one or more corresponding databases may be designated for action. Such database(s) may be selected from a list of databases and may include, for example, an all-invitees database, an all-participants database, a private or public database, a global database or any other specific or shared database(s) desired by the selecting user, such as data sets 92, 94, 96, 98, etc, described herein. A database(s) available to the user for designation at 256 may vary depending on the authority possessed by the accessing user; for example, whether the access gained at 252 is by an administrator or a bookrunner.

At 258 users to whom authorization criteria are to apply for the data sets designated at 256 may be designated. Such users can for example include all users of the selected database(s), or specific users or subsets of users. Thus for example there can be set a single, or common, authorization criteria (e.g., access code) for each of the selected data sets, individual access codes specific to individual users for all access required by the users, or distinct codes for each user-data set combination to be authorized.

At 260 an inquiry can be as to made whether any higher-level (i.e., more restrictive, as for example bookrunner-group specific) authorizations are to be set. If such authorizations are to be set, then at 262, at least one user and a corresponding data set may be selected to set authorization criteria for. One or more users may be selected, all invitees may be selected, all participants may be selected, all bookrunners may be selected, or administrators or any other subset of the users may be selected.

At 264 authorization criteria suitable for use by, for example, processor 12 in authorizing access to any designated data sets are set for any designated users. For example, sufficiently secure coded data are stored in association with data records identifying both the authorized user(s) and the corresponding data set(s). Thereafter the access codes can be securely communicated to the affected users for use in accessing desired and authorized data.

In proposing and managing transactions such as the offering of syndicated loans, the maintenance, preservation, and control of information can be of extreme importance, and in some circumstances this is particularly true of information useful for establishing and/or maintaining communications with parties involved in the transaction. Thus among the many beneficial features offered by the invention is a mechanism for preserving such contact information entered or maintained by, or otherwise associated with, one or more individual system users. Such a feature is particularly useful when, for example, a user such as an arranger, lender, borrower, or service provider initiates a process of deleting a set of contact data.

Figure 12:
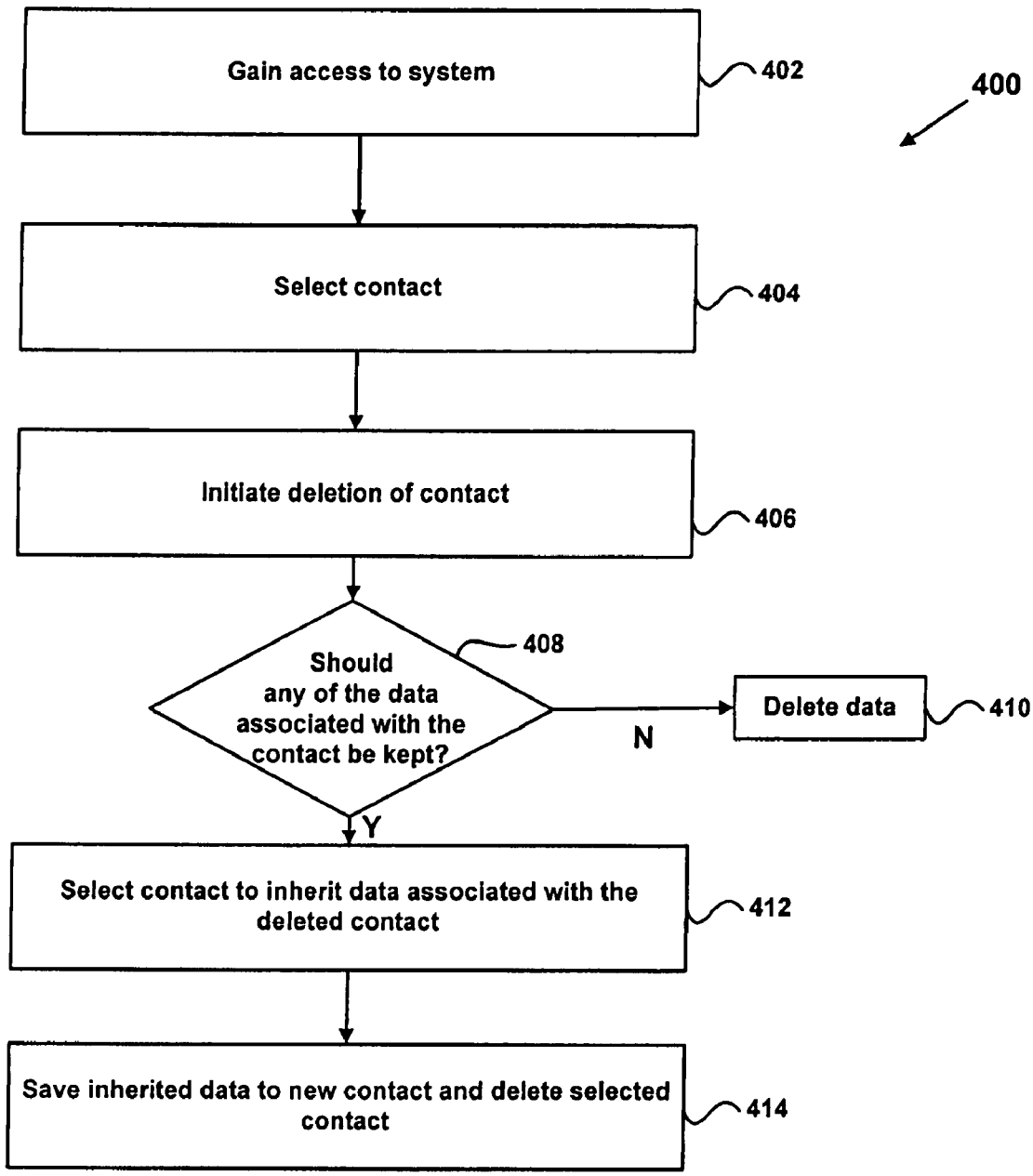

FIG. 12 is a schematic flow diagram of an embodiment of a process for preserving contact information in accordance with such features of the invention. Process 400 provides a method for deleting information that is stored in one or more of data set(s) 14. In particular, process 400 provides methods for saving such data, and associating it with new data records so that it stored in form accessible by users who continue to use the system 100 and/or the otherwise deleted data after it has been deleted by a particular user. Data preserved according to process 400 may for example, include an entire contact data set, or a group of entire data sets, or portions of one or more such contact data sets. For example, in various embodiments process 400 provides for deletion of information related to an individual contact (e.g., a particular officer or employee of an institution such as bank or other lender) while preserving documents and other information associated with the contact, his/her institution, and/or a particular transaction or set of transactions.

At 402 a user who has stored contact data gains access to the system, for example by using suitably-adapted secure log-on processes. At 404 the user selects to be deleted. Data selected at 404 may be contact information, deal information, summary information, or any combinations thereof, and may be stored in any of dataset(s) 14.

At 406 deletion of the data is initiated. This may be accomplished, for example, by a user selecting or implementing a suitably-configured command on a computer, for example as in computing device 22 of system 100. This may further involve the user interacting with hypertext links and/or graphical interface items such as tabs, lists and other user interface components to navigate to, and select, the data that is to be deleted. In some preferred implementations of the invention, deletion of some data sets, such as for example deletion of contact information, can only be done by a bookrunner or other specifically authorized user, for example where the information relates to a private contact and is accessible solely by, or with the authorization of, that bookrunner. In other cases, bookrunners or other users can only request but cannot complete processing for deletions. In such embodiments a tool such as an Administrator delete function can be provided, through the use of which notification of processed deletions (e.g. the contact deleted and chosen replacement contact) can be provided to the requesting (deleting) bookrunner and to any other bookrunners that had invited that deleted contact to participate in a current deal.

At 408 the user is offered an option of preserving any of the data included in the data set designated for deletion. Such an option may be initiated at the request of the deleting user, or may be presented automatically by suitably-configured program structures executed by processor 12.

An example of a user interface screen useful for enabling a bookrunner, administrator, or other user to make such determinations is shown in FIG. 13. In the example shown in FIG. 13, a display associated with a user system from which a request to delete data associated with a contact 'Caroline Daser' is caused to display a warning that the contact associated with the designated data may be associated with established relationships to other deals and/or bookrunners. For example, the system 22, 120 to which such a deletion request has been made can search the identified data set, and all related databases or other data sets, to identify such other deals and/or bookrunners, and cause the display to display (a) at 1602, a listing of types of relationships, deals, and/or related data associated with the contact identified for deletion, and (b) at 1604 a listing of contacts identified by the system 22, 120 as having established relationships with the contact.

As a further example, when a user attempts to delete contact information there may some contact information (such as deal comments, investor notes, fax numbers or other information for parties invited to the same deal) that is to be saved. In such a case the user may be presented with a list of possible contacts from the same bank/institution that are related to the contact to be deleted. The relation may be that the two contacts are the same (i.e., duplicate records, or work in the same city/department/branch, etc., as the deleted contact, share a common e-mail address, or other relationships. The user, being presented with such substitute contacts, may be enabled to select which contact the information should be transferred to.

If at 408 there is no such associated data to be reviewed, or an instruction is received by a authorized reviewing user confirming that the data should be deleted, at 410 the data selected at 404 is deleted. If, at 408, there is data that should be kept then process 400 continues at 412 where the appropriate location to save the data is determined.

The determination at 412, similar to the decision at 408, may be made or suggested by a user or may be made or suggested by system 100. Such a determination may be based on, for example, the similarity between contacts such as their employer or their deal information, or may be based on which database or databases the information that is to be deleted is stored in. After the determination is made at 412, process 400 continues to 414 where the data is saved in its new location and the data that was selected at 404 and is not to be kept is deleted.

Thus the invention provides systems, process, and computer-executable media adapted for causing a computer to provide for a display device associated with a user input system signals usable by the display device for displaying a user interface comprising data useful by a user for communicating with at least one of a bookrunner, an arranger, an underwriter, a borrower, a participant, an invitee, and a loan service provider; and upon receiving from the user input system signals representing a command to delete from memory accessible by the user at least a portion of the data useful for communicating, associating the data useful for communicating with at least one different bookrunner, arranger, underwriter, borrower, participant, invitee, or loan service provider (e.g. another user).

Such systems, processes, and computer-executable media can base such associating of data useful for communicating with at least one different bookrunner, arranger, underwriter, borrower, participant, invitee, or loan service provider on a variety of factors, including for example at least partly on a comparison of the data useful by a user for communicating with the at least one bookrunner, arranger, underwriter, borrower, participant, invitee, or loan service provider and data useful for communicating with the at least one different bookrunner, arranger, underwriter, borrower, participant, invitee, or loan service provider.

Data preserved in such fashion can include, for example, declines, commitments to deals, contact data, and deal comments.

Another particularly useful feature offered by the invention is the automatic notification of users of changes in data and other information related to transactions. Such notifications may be provided to users who have expressly requested notification, or for whom messages are intended to be sent upon designation by an arranger or administrator, and they may relate to any type of occurrences with respect to changing of information related to a deal or deals that the users are associated with. For example, a user may want request notification upon storage or modification of data relating to or representing deal-related documents being added, contact information being changed, or new participants or invitees added to a transaction list. System 100 and/or any authorized bookrunner or other arranger or administrator may also determine that particular users should be sent certain messages.

Figure 14A:
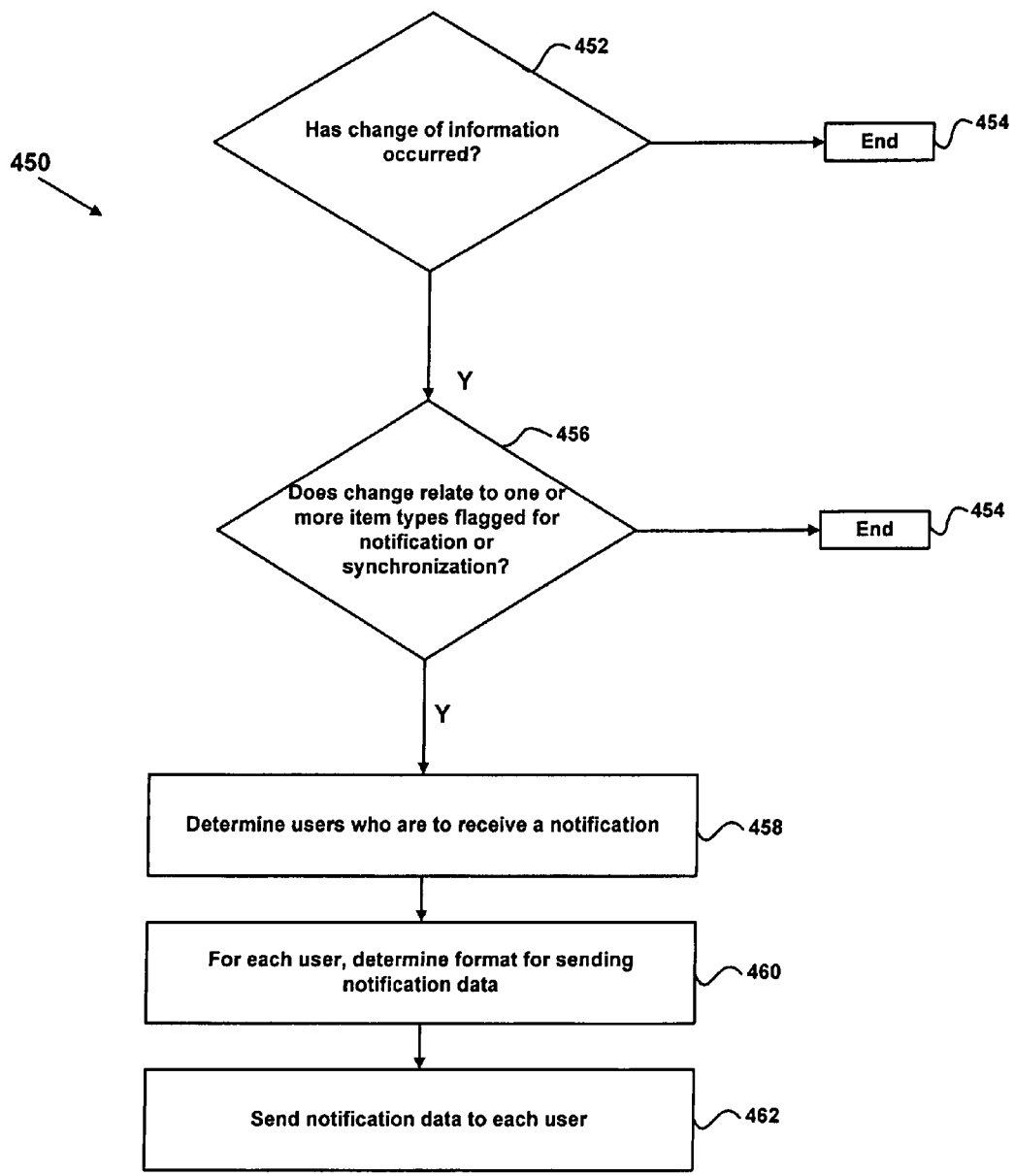
FIG. 14A is a schematic flow diagram of an embodiment of a process in accordance with the invention.

FIG. 14A presents a schematic flow diagram of an example of such a process. Process 450 begins at 452 with a determination of whether information of any suitably designated type has changed. Information that has changed may relate to deal information, to a particular data set (e.g. any or all of data sets 92, 94, 96, 98), or to the information that one bookrunner controls, or any other desired matter.

The determination at 452 may be triggered by any desired event, including for example a timed or periodic review, or a change in data structures or individual data items or records comprising suitable flags.

If designated data has changed, at 456 synchronization and/or notification can be triggered.

Exemplary changes of information that could be used as triggers for synchronization and/or automated notification include a bookrunner obtaining a commitment from an invitee/participant, a contact adding a comment that relates to a tranche or other aspect of the deal they are not a participant in, or addition of a new document to one bookrunner database or dataset that may need to be copied into another dataset or database relating to another bookrunner, or copied into a public dataset of the bookrunner so other users may view it. Such changes are exemplary only, the datasets or databases may be synchronized in response to other changes.

If, for example, when a bank commits to deal, the bookrunner who obtained the commitment will record the committed amount and related information in the Bookrunning page. At 456, the system may determine that details have changed, meaning that other related details have also changed. The system may then synchronize the overall deal financial details by adding the total commitment obtained by each bookrunner to arrive at a new total amount of the deal that has been sold.

By way of a further example, a bookrunner may post a comment to their database relating to the status of their portion of the deal, as it relates to the deal as a whole. Such a comment may be deemed to be a 'deal-level comment'. In such a case, the system may synchronize comments between bookrunners' databases or datasets—replicating the comment in each bookrunner's database or dataset.

Performing a synchronization at 456 may involve a user causing the change to input instructions indicating whether to synchronize and/or what synchronization actions to take. In other embodiments, the system may make such determinations without a user's input.

After or at the same time as the possible synchronization, 456 there is a determination of whether the change relates to one or more notification data items. The one or more notification data items set out the changes of information that will trigger a notification for one or more users, who may have been pre-identified by, for example, association with designated groups of users such as all users designated by or associated with a bookrunner, lender, or service provider. By way of example, a change in the name of a contact that already exists may not trigger a notification, as the name change may simply correct a spelling mistake. If the change does not relate to one or more notification data items, then process 450 ends at 454. If the change does relate to one or more notification data items, then the process 450 continues to 458 to determine users who are to receive a notification. The determination at 458 may involve, for example, going through each user and checking whether they have the corresponding notification data item that indicates that they want to be notified when that particular change occurs.

It will be noted that users may be enabled to designate, at the times of changes or deletions, a user or users that should receive notification. This may for example occur if a change in information results in a synchronization to another bookrunner's database such as adding a new comment. A user of another bookrunner's database or dataset may have the notification data item to provide them notification upon addition of a comment to their bookrunner's database. Were it not for the synchronization, the system may not recognize, at 458, that they should receive a notification.

In other embodiments, notification data items may allow specification that if changes to another bookrunner's database or dataset apply outside of that bookrunner's database, then the user wants to receive notification.

Process 400 can continue at 460, where for each user that is to receive a notification, a format to be used in sending the notification is determined. Exemplary formats for sending the notification data include email, fax, SMS, text messaging, letter, automated telephone call, or other forms. Process 450 then proceeds to 462 where the notifications are sent to each intended user.

An example of a notification 1401 in the form of an e-mail provided to a user "Beatriz Lacaz" of the new availability of a group of documents 1402 is provided in FIG. 14B. A hypertext link 1403 and contact information 1404 are provided as aids to gathering additional information, if desired.

Figure 14D:
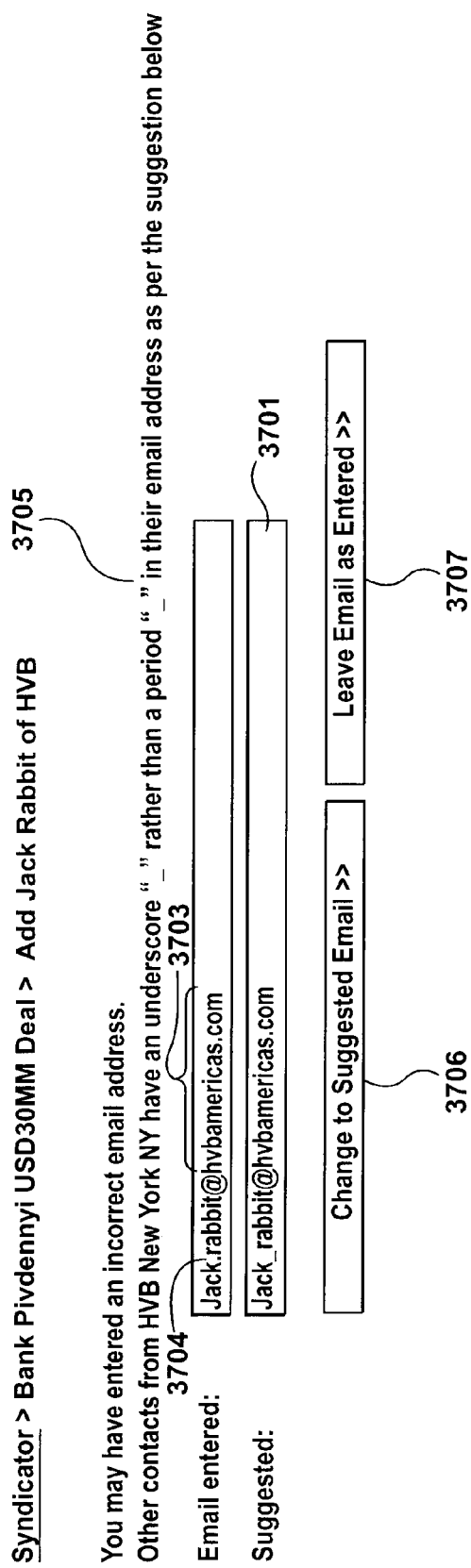

Further examples of synchronization and automated, intelligent correction of data are shown in FIGS. 14C and 14D. The features shown in FIGS. 14C and 14D are provide particularly helpful aids to the avoidance of errors in data entry.

In the example shown in FIG. 14C, a user has entered at 4001 an e-mail address and at 4002 last and first names of an individual associated with that address. Upon subsequent entry of "Next" execution command 4003, processor 12 has executed comparison logic which has compared the first and last names of input fields 4002 to portions 4004 and 4005 of the address in field 4001, based on commonly-used business e-mail formats, which have been previously analyzed and suitably programmed. As a result of the comparison, processor 12 has made a determination that the spelling of last name "Rabbit" at 4002 may not agree with portion 4005 "Ravbit" entered at 4001, and has issued a suitable error warning message 4006. The user is accordingly provided an opportunity of correcting the data entered and re-executing command 3603 for reading and potential storage of data entered. Upon re-entry of identical data, processor 12 can execute logic to accept the data as correct, and store it in spite of the apparent discrepancy.

In the example shown in FIG. 14D, processor 12 has executed logic to parse data entered at 3701 and compare individual parsed fields with corresponding fields of other data records sharing common field data. Based on the format of other, previously-stored records sharing data in fields 3703, the processor has executed logic to suggest a change in format to field delimiter 3704 to conform to formatting in such previously stored data, and has caused a warning 3705 to be displayed. In the example shown, the user is provided options 3706 for changing to the suggested format and 3707 to confirm the data as entered, and to cause that data to be stored for future use.

Thus the invention provides systems, processes, and computer-executable media for causing a computer, upon receipt of signals adapted for causing the computer to change at least one instance of a redundantly-stored data item associated with the syndicated loan offering, to change at least one other instance of the redundantly-stored data item. Changing an instance of a redundantly-stored data item can include, for example, over-writing, replacing, and deleting the item, or any portion thereof.

The changing the at least one other instance of the redundantly-stored data item can be performed subject to confirmation by a user, so that the change is contingent upon receipt of a confirmation command signal from the same or another user input system.

The invention further provides such systems, processes, and media wherein, upon changing the at least one other instance of the redundantly-stored data item, the processor (e.g., processor 12) is caused to provide output signals representing notification of the changing of the at least one other instance of the redundantly-stored data item. Such notification signals can be formatted for communications processing according to an electronic communication protocol, such as one or more of electronic mail, Signal Message Service, and telephone facsimile protocols.

Figure 15A:
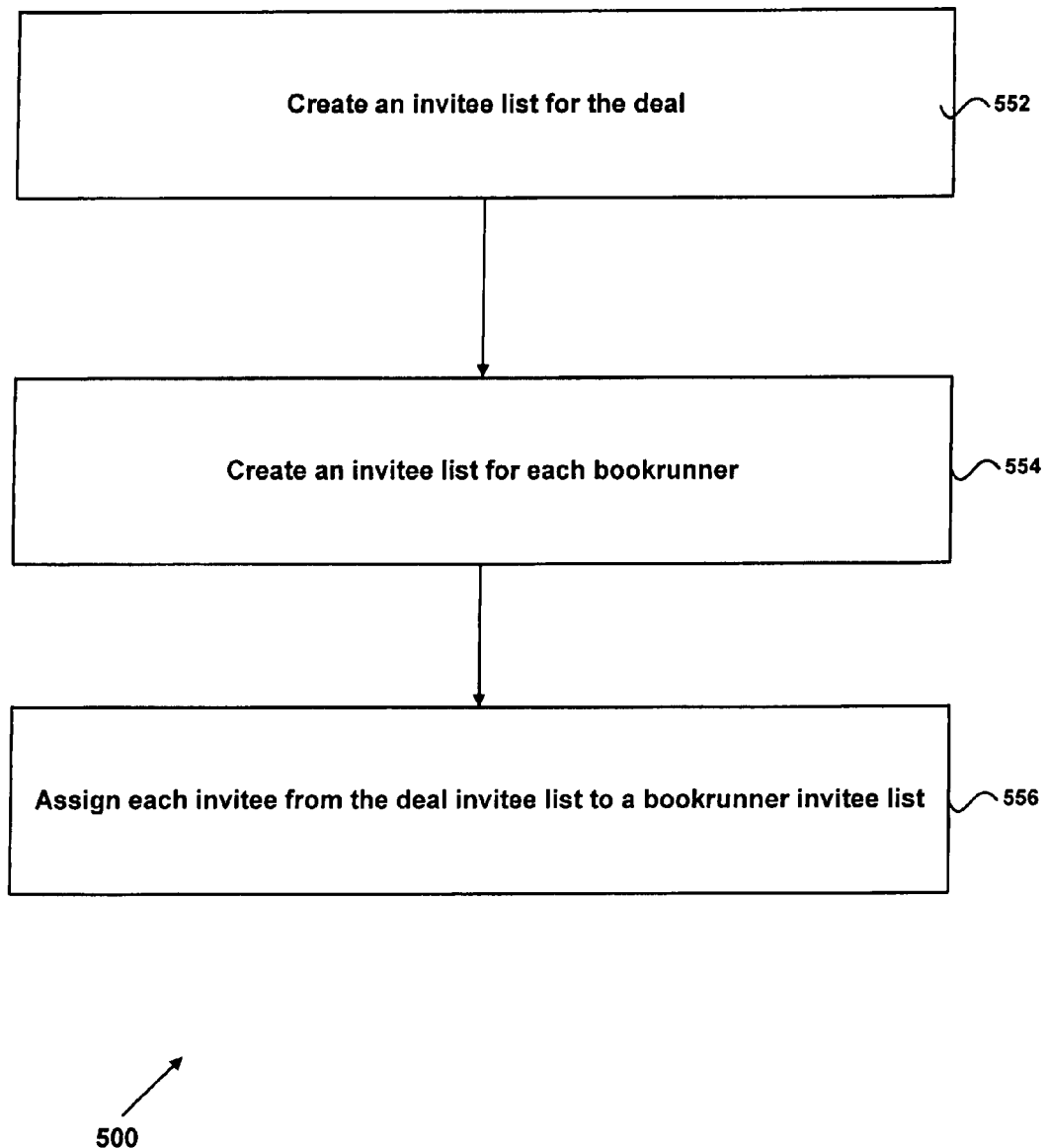
FIG. 15A is a schematic flow diagram of an embodiment of a process in accordance with the invention.

FIG. 15A is a schematic flow diagram of an embodiment of a process for creating invitee lists in accordance the invention.

In many presently-preferred embodiments, each bookrunner is enabled to add any invited individual or institution, and such institutions by default become mapped to the bookrunner that added it. Refinements to the invitee split can be accomplished in the Allocate Bookrunners page.

In the embodiment shown in FIG. 15A, process 550 allocates invitees for a deal and creates invitee lists for a deal, beginning at 552 where an invitee list for the deal is created. Creating an invitee list for each bookrunner associated with the deal may involve importing data associated with invitees from other deals where they were a bookrunner, manually entering invitees, or by selecting from the bookrunner's respective private contact database or the public contact database, or by importing a list prepared by an external application such as a spreadsheet. Once an invitee list has been created at 552, process 550 may continue to 554 where a invitee list for each bookrunner is created. The invitee list for each bookrunner created at 554 may for example substantially be an empty invitee list that will be filled from the deal invitee list, or may be an invitee list that has already been partially populated by invitees that the bookrunner is already aware of.

After creation of an invitee list at 554, process 550 continues at 556 where each invitee from the deal invitee list can be assigned to a responsible bookrunner, if a default assignment has not already been made automatically. At 556, process 550 ensures that invitees are not missed, and are assigned to a bookrunner invitee list. It may be desirable, according to process 550, for an invitee to only be assigned to one bookrunner invitee list so that an invitee does not have multiple bookrunners contacting them for involvement in the deal. However, it is not outside of the scope of the present invention for an invitee to be on one or more bookrunner invitee list as well as being on the deal invitee list. This may occur if, for example, at 554 a bookrunner has an invitee list, that they have imported from another deal, in a private database, and then the invitee is assigned to a different bookrunner invitee list at 556.

The invention further provides improvements in the entry of data, and particularly in improved efficiency in completing the entry of related data items, such as telephone numbers and geographic locations. For example, the invention provides for the suggestion of data items to be associated with multi-item data records, based on relationships between items.

FIG. 15B is a user interface for adding a contact to a database in accordance with an embodiment of the present invention. In some presently-preferred embodiments, the entirety of the interface shown in FIG. 15B is accessible only to authorized administrators. To non-administrators, in such embodiments, only the information displayed under the heading "Contact Info" is made available; the "Admin Details" section is not.

In the example shown, a bookrunner or other user has invoked a command for the display of an interface screen comprising a variety of data input items corresponding to relevant classes of information, including drop-down menus 671, type-in input fields or boxes 672, "radio button" option menus 673, and option/selection boxes 674. Based on data input using various of the input items, processor 12 can search records stored in data structure(s) 14 for related, previously-entered data, and provide over-rideable default entry of all or portions of such related, previously-entered data as input for the new data record. For example, having previously identified the new contact 3801 "Inna Gogoua" as affiliated with National City Bank (United States), default information relating to branches, and associated city names 3802, addresses, and telephone area- or city-codes 3803 can be provided as default entries. Additionally, proposed e-mail addresses 3804 can be constructed from previously-entered related e-mail addresses (e.g., addresses for co-workers for a newly-entered contact) and known e-mail formats used by the institution with which the contact is affiliated. Incorrect information provided as defaults can be overridden in any suitable manner, as for example by typing in text boxes 672, selection of other options from pull-down menus 671 or radio-buttons 673, or browsing using items 681.

Figure 15C:
Figure 15D:
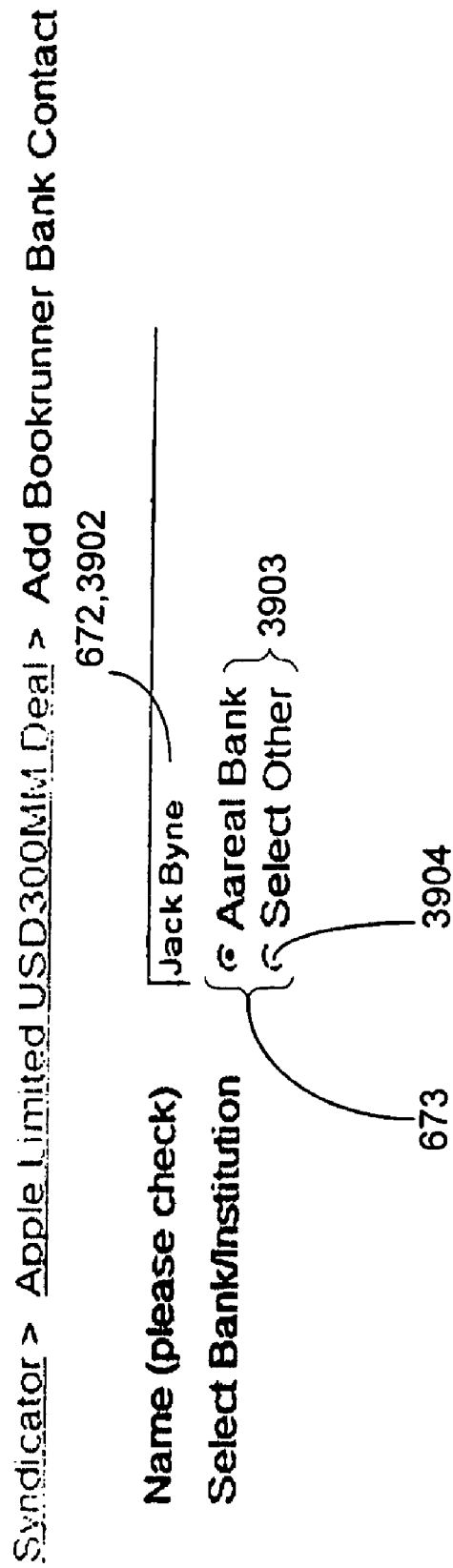
Figure 15E:
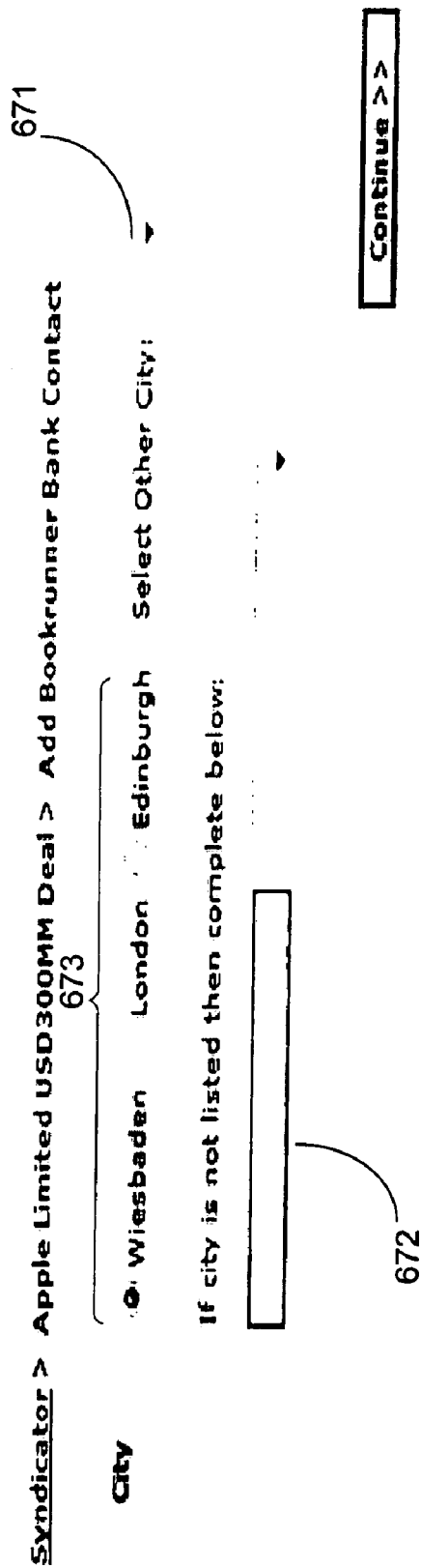

An example of a process for adding a contact affiliated with an institution such as a bank is shown in FIGS. 15C-15E. Using the interface shown in FIG. 15C, a user has accessed an interface adapted for adding any contact, whether or not affiliated with any bank or other institution. In an initial step, the user has entered e-mail address "jack.byne@Aarealbank.com" in text-entry box 672. Selection of execution command item "Continue" 3901 can result in reading and parsing of the data entered in box 672 by processor 12, and comparison of some or all of the resultant parsed data items with data records and known data formats previously stored in data structure(s) 14. Based on such a comparison, processor 12 can identify one or more likely default values for contact name, etc., and possible matches for likely institutional affiliations of the contact.

For example, as shown in FIG. 15D, processor 12 has suggested, based on such a comparison, that the contact's name is likely "Jack Byne", and at 672, 3902 has presented a corresponding over-rideable default contact name. At 3903, the processor has suggested a probable institutional affiliation "Aareal Bank", together with radio button options for selecting "Aareal Bank" as a correct affiliation or requesting, via "Select Other" button presentation of a further interactive screen for entry of a different institution name, and optionally further related data.

When the user has indicated by selection of the corresponding radio button that "Aareal Bank" is the correct institutional affiliation, processor 12 can cause a display such as that shown in FIG. 15E to be presented. FIG. 15E provides radio button options for cities corresponding to major known offices of the selected institution, together with both a pull down menu 671 of relatively less frequently designated branches, and box 672 for manual entry of cities corresponding to offices not listed in items 673 or 671.

An innovation in the management of contacts is the basis of location by City rather than the commonly used Country fields of other contact management systems. In some presently-preferred embodiments, systems according to the invention neither have nor need Country fields. The intelligent construction of lists provided in pull-down menus 671, radio-button option fields 673, etc., is another advantageous feature provided by the invention. As shown in FIG. 15E, for example, differing levels of default or suggested input options can be provided, based on reviews of data stored in structure(s) 14, on the frequency with which responses are provided by system users, or from pre-programmed decision trees.

Figure 15F:
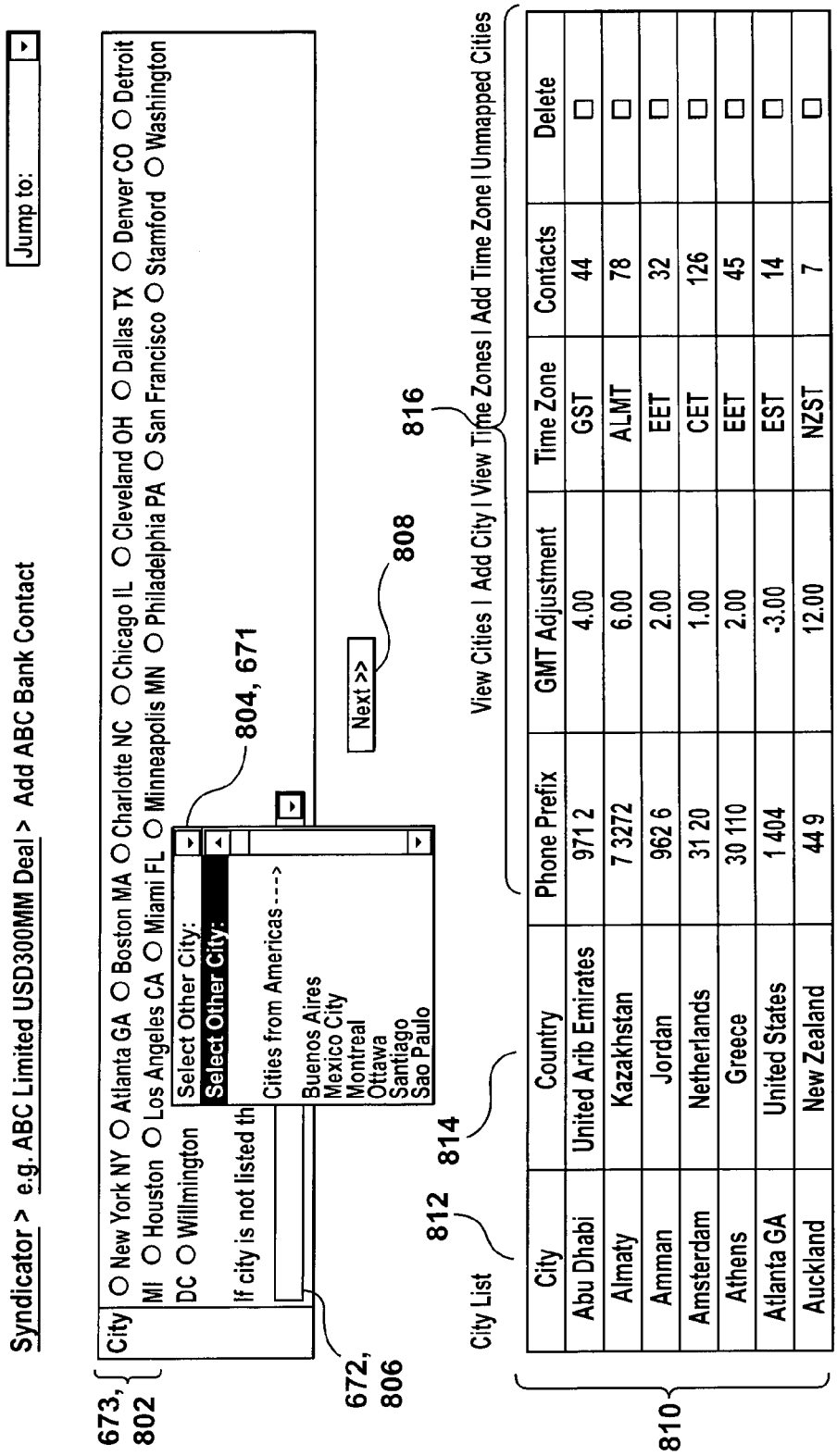

A further example, relating to the addition of a new bank as an institutional contact, is shown in FIG. 15F. Among data items to be associated with the corresponding contact data record are cities menu 673, 802, "Other City" pull-down menu 671, 804, and text-entry box 672, 806.

Radio-button input field 673, 802 can, as previously described, be assembled by processor 12, working from data structure(s) 14, using data corresponding to the largest, most prominent, or most-frequently chosen offices associated with the new bank "ABC Bank". For less well-known or less frequently-chosen offices, pull down menu 671 can be provided (among other advantages, the use of pull-down menus 671 in addition to radio-button fields 673 can save important screen space on interface displays). And the provision of text input fields 672 can provide options for new offices, or offices previously unknown to the system 100.

Other useful sources for options included in fields and menus 673, 671 are the locations of other important parties in a transaction, such as borrowers, arrangers, or other key lenders.

City list 810 may be provided at the same time as city selector 802, to provide for rapid and efficient entry of cities and/or offices not previously associated with the contact, but prominent in the field or industry in which the transaction is to take place, so as to save time and effort.

When for example a user selects or specifies a city, the system may store the city that is being selected and automatically associate that city with a country and various other details about the city. The country and the various details about the city may be acquired from city list 810, which may be presented to the user or may simply be stored and accessible by the system when next button 808 is selected.

As will be understood by those skilled in the relevant arts, various fields or functions provided through the use of the interface shown in FIG. 15F, and in other interfaces described herein, can be limited to various users or classes of users. For example, portions of the interface shown in FIG. 15F adapted for creation of a new contact can be limited to bookrunners, arrangers, or other administrative users. Other functions, including for example field 810, which can be used for management of a global city or contact list, can be accessed by all bookrunners or other users authorized to contribute to the maintenance of the list.

While the invention has been described in some detail for purposes of clarity and understanding, it will be appreciated by those skilled in the relevant arts, once they have been made familiar with this disclosure, that various changes in form and detail can be made without departing from the true scope of the invention set out in the claims. The scope of the invention is therefore not to be limited to the exact components or details of methodology or construction set forth above.

Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described.

It is to be understood that the invention is, in relevant part, described herein only in terms of strict financial or other possibility. Actual implementation of the invention may be subject to regulatory or other legal requirement(s), and no representation is made hereby that any particular embodiment complies with any regulatory or other requirement(s).

What is claimed is:

1. A computer-usable medium or media for storing and processing data stored in a data structure accessible to multiple users, the multiple users being authorized to control access to data stored in the data structure according to respective user authorizations, the medium comprising computer-readable code embodied therein for causing a computer to:

receive signals representing data identifying a plurality of parties invited to participate in a syndicated loan transaction, at least one of the invitees being invited by each of a plurality of syndicated loan bookrunners to participate in the syndicated loan offering; and subject to receipt of signals representing acceptance of such invitations by the invitees, create data identifying the invitees as participants in the syndicated loan offering and associate with the said data identifying each participant, data representing a data-access authorization, the data-access authorization being associated with each respective participant adapted to permit access by the respective participant to at least a deal data set and a bookrunner data set, the bookrunner data set being accessible by the bookrunner that invited the participant to participate in the loan, by the respective participant, and by at least one other participant invited by the bookrunner to participate in the loan, and the deal data set being accessible by all participants participating in the syndicated loan offering.

2. The medium or media of claim 1, comprising computer-readable code embodied therein for causing a computer to, subject to verification of data representing a request from an authorized participant, provide access to data stored within at least one of the bookrunner data set and the deal data set.

3. The medium or media of claim 1, wherein the data received by the computer and identifying the plurality of invitees comprises data identifying the bookrunner that invited the respective invitee and data identifying the syndicated loan in which the respective invitee is invited to participate.

4. The medium or media of claim 1, comprising computer-readable code embodied therein for causing a computer, upon receipt from a bookrunner of data identifying at least one of the plurality of invitees and an execution command originated by the bookrunner, to automatically generate for each of the invitees identified by the bookrunner a communication conveying an invitation to participate in the syndicated loan offering.

5. The medium or media of claim 4, wherein the communication conveying the invitation is an encoded electronic communication.

6. The medium or media of claim 5, wherein the encoded electronic communication is generated in an electronic mail format.

7. The medium or media of claim 5, wherein the encoded electronic communication is generated in a telephone facsimile format.

8. The medium or media of claim 5, wherein a plurality of invitations are generated, and the corresponding encoded electronic communication is generated according to a list merge process.

9. The medium or media of claim 4, wherein the invitation is editable by the bookrunner prior to being sent to the corresponding invitee.

10. The medium or media of claim 1, wherein the respective authorizations for the multiple users are different for individual users or for different sets of individual users.

11. The medium or media according to claim 10, wherein there is overlap between some of the respective authorizations.

12. A method of processing data stored in a data structure accessible to multiple user computers, the multiple users being authorized to control access to data stored in the data structure according to respective user authorizations, the method comprising:
   receiving signals representing data identifying a plurality of parties invited to participate in a syndicated loan transaction, at least one of the invitees being invited by each of a plurality of syndicated loan bookrunners to participate in the syndicated loan offering; and
   subject to receipt of signals representing acceptance of such invitations by the invitees, creating data identifying the invitees as participants in the syndicated loan offering and associate with the said data identifying each participant, data representing a data-access authorization, the data-access authorization being associated with each respective participant adapted to permit access by the respective participant to at least a deal data set and a bookrunner data set, where
   the bookrunner data set is accessible by the bookrunner that invited the participant to participate in the loan, by the respective participant, and by at least one other participant invited by the bookrunner to participate in the loan, and
   the deal data set is accessible by all participants participating in the syndicated loan offering.

13. A method for processing data pertaining to a syndicated loan offering to be administered by a plurality of bookrunners, the method comprising:
   in response to submission to a syndicated loan application server of a data-access authorization received in response to acceptance of an invitation from one of a plurality of bookrunners administering a syndicated loan offering to participate in the syndicated loan offering, either as a loan participant or as a loan arranger, enabling access to data stored within at least one of a bookrunner data set and a deal data set; wherein
   the data-access authorization is adapted to permit access by the respective participant to at least a deal data set and a bookrunner data set,
   the bookrunner data set is accessible by the bookrunner that invited the participant to participate in the loan and by a plurality of loan participants invited by the bookrunner to participate in the loan, and
   the deal data is set accessible by all participants and all bookrunners participating in the syndicated loan offering.

14. A system useful for storing and processing data stored in a data structure accessible to multiple users, the multiple users being authorized to control access to data stored in the data structure according to respective user authorizations, the system comprising a processor adapted to:
   receive signals representing data identifying a plurality of parties invited to participate in a syndicated loan transaction, at least one of the invitees being invited by each of a plurality of syndicated loan bookrunners to participate in the syndicated loan offering; and
   subject to receipt of signals representing acceptance of such invitations by the invitees, create data identifying the invitees as participants in the syndicated loan offering and associate with the said data identifying each participant, data representing a data-access authorization, the data-access authorization being associated with each respective participant adapted to permit access by the respective participant to at least a deal data set and a bookrunner data set,
   the bookrunner data set being accessible by the bookrunner that invited the participant to participate in the loan, by the respective participant, and by at least one other participant invited by the bookrunner to participate in the loan, and
   the deal data set being accessible by all participants participating in the syndicated loan offering.

15. A system useful for controlling the storage and processing of data stored in a data structure accessible to multiple users, the multiple users being authorized to control access to data stored in the data structure according to respective user authorizations, the system comprising a processor adapted to:
   in response to submission to a syndicated loan application server of a data-access authorization received in response to acceptance of an invitation from one of a plurality of bookrunners administering a syndicated loan offering to participate in the syndicated loan offering, either as a loan participant or as a loan arranger, enable access to data stored within at least one of a bookrunner data set and a deal data set; wherein
   the data-access authorization is adapted to permit access by the respective participant to at least a deal data set and a bookrunner data set,
   the bookrunner data set is accessible by the bookrunner that invited the participant to participate in the loan and by a plurality of loan participants invited by the bookrunner to participate in the loan, and
   the deal data is set accessible by all participants and all bookrunners participating in the syndicated loan offering.

16. A system useful for controlling the storage and processing of data stored in a data structure accessible to multiple users, the multiple users being authorized to control access to data stored in the data structure according to respective user authorizations, the system comprising a processor adapted to:
   associate with data received by the computer data identifying the received data as associated with a syndicated loan offering and as associated with one of a plurality of bookrunners administering the syndicated loan offering;
   store the received data in persistent computer-readable memory, and, subject to verification of authority, allow access to the stored data by at least one of:

the bookrunner with whom the stored data has been associated, and a participant authorized on behalf of the bookrunner to access the data.

17. A method for processing data pertaining to a syndicated loan offering to be administered by a plurality of bookrunners, the method comprising:

associating with data received by the computer data identifying the received data as associated with a syndicated loan offering and as associated with one of a plurality of bookrunners administering the syndicated loan offering;

storing the received data in persistent computer-readable memory, and, subject to verification of authority, allowing access to the stored data by at least one of:

the bookrunner with whom the stored data has been associated, and a participant authorized on behalf of the bookrunner to access the data.

18. The method of claim 17, wherein the stored data comprises data representing one or more documents associated with syndicated loan offering.

19. The method of claim 18, wherein the stored data comprises data relating to one or more confirmed or potential loan bookrunners, underwriters, participants or invitees.

20. The of claim 17, comprising, upon receipt of signals adapted for causing the computer to change at least one instance of a redundantly-stored data item associated with the syndicated loan offering, changing at least one other instance of the redundantly-stored data item.

21. The method of claim 20, wherein the changing the at least one other instance of the redundantly-stored data item is contingent upon receipt of a confirmation command signal from the same or another user input system.

22. The method of claim 20, comprising, upon changing the at least one other instance of the redundantly-stored data item, providing output signals representing notification of the changing of the at least one other instance of the redundantly-stored data item.

23. The method of claim 22, wherein the notification signals are formatted for communications processing according to an electronic communication protocol.

24. The method of claim 23, wherein the electronic communication protocol comprises at least one of an electronic mail, Signal Message Service, and telephone facsimile protocols.

25. A method for processing data pertaining to a syndicated loan offering to be administered by a plurality of bookrunners, the method comprising:

upon entry of an execution command from a bookrunner or invitee input system, accessing data corresponding to the status of a plurality of criteria relating to the offering of the syndicated loan, access to said data controlled by a plurality of bookrunners administering said syndicated loan offering; and displaying on an output device associated with the borrower input system, in human-readable form, information indicating said status.

26. The method of claim 25, comprising, upon entry of an execution command from a borrower or other input system, outputting data corresponding to the status of a plurality of criteria relating to the offering of the syndicated loan in a spreadsheet format.

27. A system useful for controlling the storage and processing of data stored in a data structure accessible to multiple users, the multiple users being authorized to control access to data stored in the data structure according to respective user authorizations, the system comprising a processor adapted to:

upon entry of an execution command from a bookrunner or invitee input system, access data corresponding to the status of a plurality of criteria relating to the offering of the syndicated loan, access to said data controlled by a plurality of bookrunners administering said syndicated loan offering; and display on an output device associated with the borrower input system, in human-readable form, information indicating said status.

28. A system useful for controlling the storage and processing of data stored in a data structure accessible to multiple users, the multiple users being authorized to control access to data stored in the data structure according to respective user authorizations, the system comprising a processor adapted to:

upon entry of an execution command from a bookrunner or invitee input system, access data corresponding to the status of invitations extended by the bookrunner to a plurality of invitees invited to participate in a proposed syndicated loan offering; and display on an output device associated with the bookrunner input system, in human-readable form, information indicating said status.

29. A method for processing data pertaining to a syndicated loan offering to be administered by a plurality of bookrunners, the method comprising:

upon entry of an execution command from a bookrunner or invitee input system, access data corresponding to the status of invitations extended by the bookrunner to a plurality of invitees invited to participate in a proposed syndicated loan offering; and display on an output device associated with the bookrunner input system, in human-readable form, information indicating said status.

30. A method for processing data pertaining to a syndicated loan offering to be administered by a plurality of bookrunners, the method comprising:

displaying on an output device associated with at least one participant or bookrunner input system, in human-readable form, information pertaining to at least one syndicated loan offering to be administered by a plurality of bookrunners, and at least one input item adapted to facilitate input by the user of data corresponding to at least one type of solicited input data; and upon entry of an input execution command by a user of the at least one client input system, reading data input by the user corresponding to the at least one type of solicited input data;

upon entry of a document assembly execution command by a user of the same or another client input system, compiling a document output data set, the document output data set compiled using the input data corresponding to the at least one type of solicited input data, and at least one document template data set, the document template data set comprising data representing standard text to be incorporated as a part of one or more documents useful in closing the syndicated loan offering; and the compiled document data set adapted for use by at least one output device to provide at least one human-readable rendering of each of a plurality of such documents.

31. The method of claim 30, wherein the document output data set is compiled using, in addition to said input data and said document template data set, data corresponding to solicited input data provided by a user other than the user who provided the document assembly execution command.

32. The method of claim 30, wherein the document output data set is compiled into a computer-editable format.

33. A system useful for controlling the storage and processing of data stored in a data structure accessible to multiple users, the multiple users being authorized to control access to data stored in the data structure according to respective user authorizations, the system comprising a processor adapted to:
- display on an output device associated with at least one participant or bookrunner input system, in human-readable form,
  - information pertaining to at least one syndicated loan offering to be administered by a plurality of bookrunners, and
  - at least one input item adapted to facilitate input by the user of data corresponding to at least one type of solicited input data; and
- upon entry of an input execution command by a user of the at least one client input system, to read data input by the user corresponding to the at least one type of solicited input data;
- upon entry of a document assembly execution command by a user of the same or another client input system, to compile a document output data set, the document output data set compiled using
  - the input data corresponding to the at least one type of solicited input data, and
  - at least one document template data set, the document template data set comprising data representing standard text to be incorporated as a part of one or more documents useful in closing the syndicated loan offering; and the compiled document data set adapted for use by at least one output device to provide at least one human-readable rendering of each of a plurality of such documents.

* * * * *

(12) EX PARTE REEXAMINATION CERTIFICATE (9939th)
United States Patent
Tai et al.

(10) Number: US 8,024,262 C1
(45) Certificate Issued: Nov. 14, 2013

(54) SYSTEM AND METHOD FOR DEAL MANAGEMENT OF SYNDICATED LOANS BY MULTIPLE BOOKRUNNERS

(75) Inventors: Sean Yat Sing Tai, Toronto (CA); Timothy Julian Davis Skinner, Dorset (GB)

(73) Assignee: Debtdomain GLMS Pte Ltd, London (GB)

Reexamination Request:
No. 90/011,910, Sep. 20, 2011

Reexamination Certificate for:
Patent No.: 8,024,262
Issued: Sep. 20, 2011
Appl. No.: 11/844,786
Filed: Aug. 24, 2007

Related U.S. Application Data

(60) Provisional application No. 60/909,201, filed on Mar. 30, 2007, provisional application No. 60/823,432, filed on Aug. 24, 2006.

(51) Int. Cl.
*G06Q 40/00* (2012.01)
(52) U.S. Cl.
USPC .............................................. 705/38; 705/37

(58) Field of Classification Search
None
See application file for complete search history.

(56) References Cited

To view the complete listing of prior art documents cited during the proceeding for Reexamination Control Number 90/011,910, please refer to the USPTO's public Patent Application Information Retrieval (PAIR) system under the Display References tab.

*Primary Examiner* — Michelle Tarae

(57) ABSTRACT

Systems, and programming for improved arrangement and administration of syndicated loans using computer networks. Each of a plurality of bookrunners is authorized to invite any number of other bookrunners, as well as any number of loan participants, or underwriters (i.e. investors or lenders), to participate in offering and administering a loan, typically by providing various forms of information describing the proposed loan, including the borrower, the proposed terms, and possibly any potential participants in making the loan. Invitees who accept such invitations may be associated with the inviting bookrunner, and upon being accepted as participants may be granted by the bookrunner access to various sets of communications, documents, and other information concerning the proposed loan.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-33 are cancelled.

\* \* \* \* \*